United States Patent [19]
Enoki et al.

[11] Patent Number: 5,730,167
[45] Date of Patent: Mar. 24, 1998

[54] HOT AND COLD WATER MIXING DEVICE

[75] Inventors: Masatoshi Enoki; Toshihide Ushita; Hideyuki Matsui; Tatsuo Matsukuma; Yuji Matsuo; Mineo Nakashima; Hirosi Tutiya; Satoru Furuta, all of Kitakyushu, Japan

[73] Assignee: Toto Ltd., Fukuoka-ken, Japan

[21] Appl. No.: 507,482

[22] PCT Filed: Nov. 8, 1994

[86] PCT No.: PCT/JP94/01879

§ 371 Date: Oct. 16, 1995

§ 102(e) Date: Oct. 16, 1995

[87] PCT Pub. No.: WO95/18324

PCT Pub. Date: Jul. 6, 1995

[30] Foreign Application Priority Data

Dec. 28, 1993 [JP] Japan .................. 5-353446

[51] Int. Cl.⁶ .................................................. F16K 11/07
[52] U.S. Cl. .................... 137/15; 137/315; 137/375; 137/597; 137/606
[58] Field of Search .................. 137/375, 15, 315, 137/597, 606

[56] References Cited

U.S. PATENT DOCUMENTS

| | | | |
|---|---|---|---|
| 4,381,073 | 4/1983 | Gloor | 137/606 X |
| 4,610,393 | 9/1986 | Rodriguez | |
| 5,467,795 | 11/1995 | Martin et al. | 137/15 |
| 5,524,668 | 6/1996 | Matsuo et al. | 137/375 |

FOREIGN PATENT DOCUMENTS

| | | |
|---|---|---|
| 0363892 | 8/1993 | European Pat. Off. |
| 47-16028 | 5/1972 | Japan . |
| 55-35576 | 9/1980 | Japan . |
| 61-42149 | 9/1980 | Japan . |
| 58-40060 | 9/1983 | Japan . |
| 59-23104 | 7/1984 | Japan . |
| 1-106680 | 7/1989 | Japan . |
| 2-196877 | 8/1990 | Japan . |
| 3-15397 | 7/1991 | Japan . |

*Primary Examiner*—Stephen M. Hepperle
*Attorney, Agent, or Firm*—Birch, Stewart, Kolasch & Birch, LLP

[57] ABSTRACT

A hot and cold water mixing device which comprises an inner housing (11) provided with a hot water inlet hole (17), a cold water inlet hole (18) and a mixed water delivery hole (19), and an outer housing (31) having openings (33, 34, 32) communicating with a hot supply passage (15), a cold water supply passage (16) and a mixed water supply passage (14). The inner housing (11) is inserted into the outer housing (31) to form a hot water passage (20), a cold water passage (35) and a mixed water passage (30) between the outer housing (31) and the inner housing (11). The hot water passage (20) and the mixed water passage (30) are formed by enclosing the hot water inlet hole (17) and the mixed water delivery hole (19) by the respective seal members (26, 29) which each are partly arranged so as to intersect with the circumferential line of the inner housing (11).

53 Claims, 27 Drawing Sheets

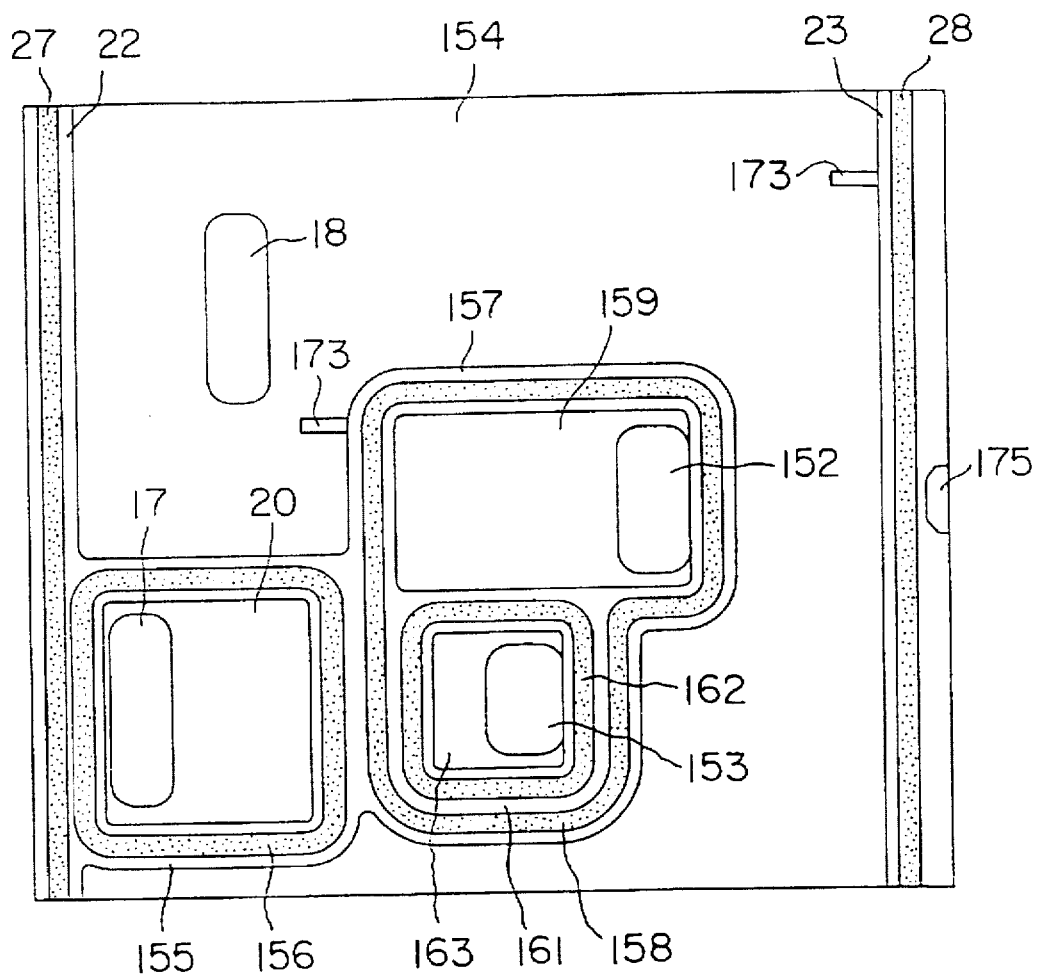
F I G. 18

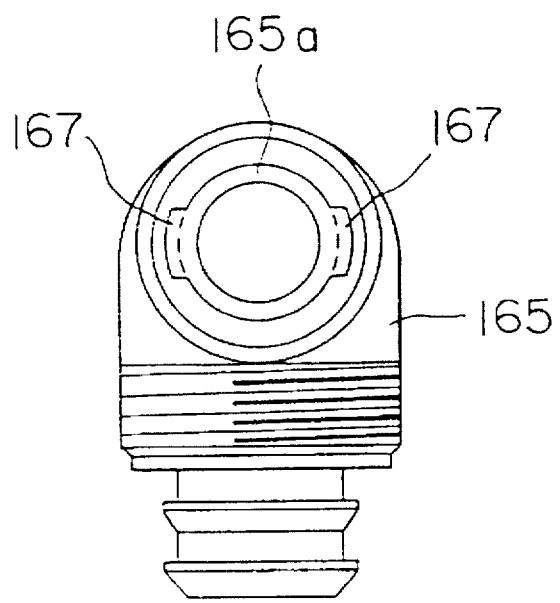
F I G. 20
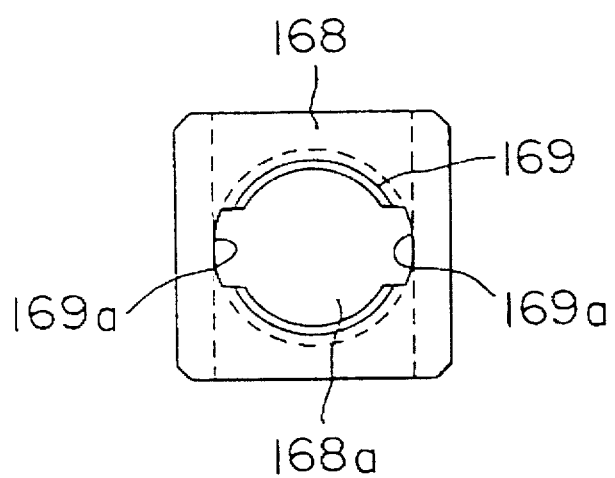
F I G. 21

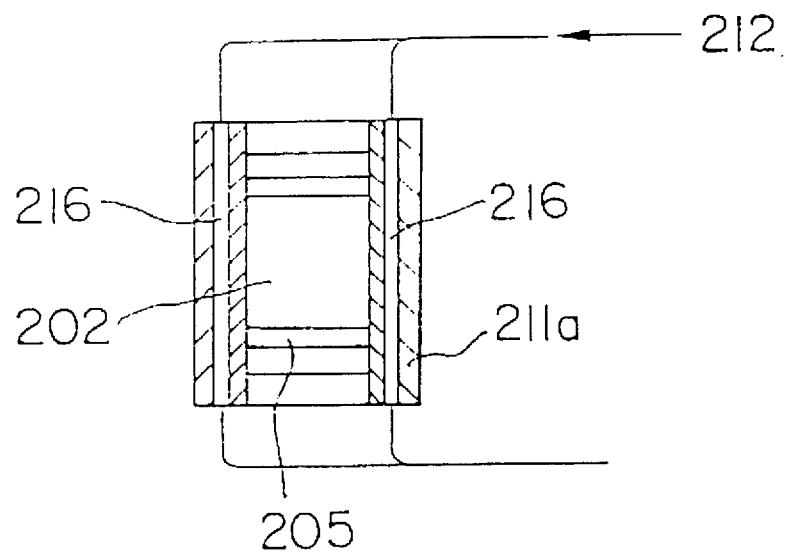
F I G. 38

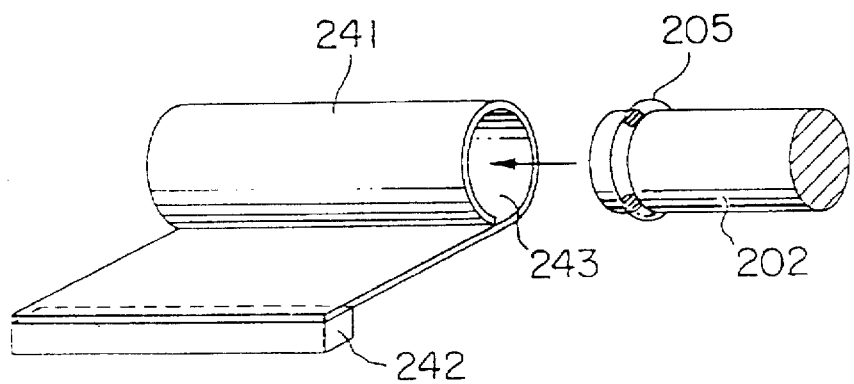
F I G. 39
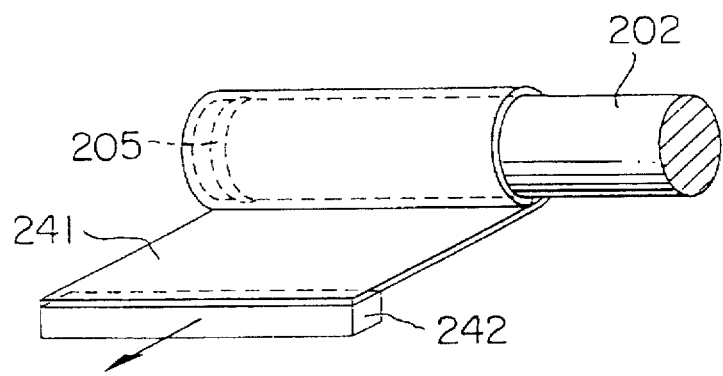
F I G. 40
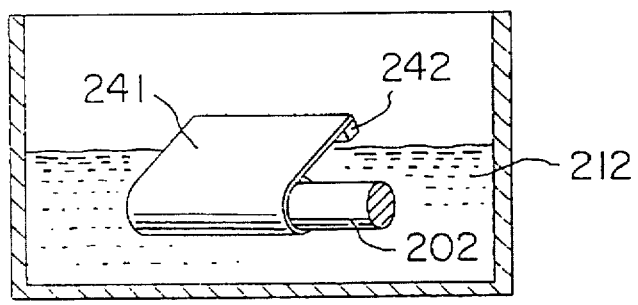
F I G. 41

HOT AND COLD WATER MIXING DEVICE

TECHNICAL FIELD

The present invention relates to a hot and cold water mixing device for mixing hot water and cold water and delivering the mixed water, and more particularly, to a hot and cold water mixing device having features in the method of constituting fluid passages in the device.

BACKGROUND ART

The hot and cold water mixing device such as a hot and cold water mixing faucet is formed therein with a hot water passage and a cold water passage, through which hot water and cold water flow, respectively, and at the same time, is formed with a mixing chamber therein for mixing the hot and cold water introduced and with a mixed water passage through which the mixed water is delivered, in order to mix the hot and cold water supplied from a hot water supply source and a cold water supply source, respectively, to deliver the mixed water having a desired temperature.

These fluid passages have hitherto been formed by providing a body (casing) of a faucet made by casting, with partition walls therein, through integral molding (for example, refer to JPB-58(1983)-40060). The body casing made by casting has an advantage in that the fluid passages therein can be formed in relatively free forms; however, there is a problem in that the body casing becomes large in configuration and also heavier in weight.

A hot and cold water mixing device has, therefore, been developed in which the body casing is composed of a hollow metal pipe material in place of the body casing made by casting, and a hollow inner casing is inserted into the pipe material, fluid passages being formed in the gap between the pipe material and the inner casing (U.S. Pat. No. 4,610,393).

In the hot and cold water mixing device comprising the pipe material and the inner casing inserted therein, the pipe material is provided with openings which communicate with a hot water supply passage, a cold water supply passage and a mixed water delivery passage, and further, the inner casing is also provided with water holes which communicate with the hot water supply passage, cold water supply passage and mixed water delivery passage. Further, the openings of the pipe material and the water holes of the inner casing are disposed with the respective openings and water holes corresponding to the hot water supply passage, cold water supply passage and mixed water delivery passage being close to each other, and seal members (O-rings) are circumferentially provided between the respective openings and the water holes, so that the hot water passage, mixed water passage and cold water passage are formed in a divided manner.

In the inner casing of this hot and cold water mixing device is incorporated a closing valve for adjusting the delivered amount of the mixed water and a mixing valve having an automatic temperature-regulating function for automatically regulating the mixing ratio of hot and cold water in the relation corresponding to a set temperature.

Accordingly, the hot water, which has flowed into the inner casing through the opening and the water hole communicating with the hot water supply passage, and the cold water, which has flowed into the inner casing through the opening and the water hole communicating with the cold water supply passage, are passed through the mixing valve and mixed there in a suitable ratio, and then the mixture is delivered from the mixed water delivery passage by the operation of the closing valve.

The hot and cold water mixing device using the pipe material and inner casing has an advantage in that the dimension of the external form thereof is made smaller and reduced in weight, as compared with that using the body casing made by casting.

However, since a plurality of O-rings are mounted on the outer peripheral surface of the inner casing to form the hot water passage, mixed water passage and cold water passage in a divided manner from one end to the other end of the inner casing, the hot and cold water mixing device comes to be parted into three distributions of temperature—a high temperature part, a moderate temperature part and a low temperature part.

This results in losing the thermal balance of the entire hot and cold water mixing device, thereby causing the deformation of the parts due to the difference in thermal expansion, the deterioration of the high temperature parts, and a decrease in precision. Further, since the hot water at a high temperature flows over the entire circumference at one end of the body of the mixing faucet, a portion of the surface of the pipe material at the side of an operator comes to be a high temperature. This is very dangerous particularly in the case where the device is used in a bathroom.

Accordingly, a proposal is made to solve the problem of the thermal balance of the entire hot and cold water mixing device as mentioned above while maintaining the advantage of the pipe material being used as the body casing (U.S. Pat. No. 4,381,073).

According to such a proposal, the hot water supplied from the hot water supply passage into the pipe material flows directly into the inner casing without flowing in the circumferential direction of the pipe material and, simultaneously, the cold water supplied from the cold water supply passage once flows into the inside of the inner casing and, thereafter, flows out again into the gap between the pipe material and the inner casing to cover the inner casing with the cold water in a greater part of the outer circumference, thereby preventing the outer surface of the pipe material from being locally heated to bring about a danger and preventing a significant thermal imbalance from being caused over the entire hot and cold water mixing device.

The hot and cold water mixing device described in the above-mentioned U.S. Pat. No. 4,381,073 solves the problem of thermal balance utilizing an advantage of the pipe material being used for the body casing; however, there is a problem in that the construction of the inner casing becomes extremely complicated and, simultaneously, an adjustment in the offsets between the openings of the pipe material and the water hole of the inner casing is difficult; so, the strict accuracy of finishing and assembly of the component parts is required.

Namely, since, in the hot and cold water mixing device described in FIG. 1 of U.S. Pat. No. 4,381,073, the hot and cold water passages are formed by a plurality of O-rings mounted on the outer circumference of the inner casing, and the mixed water passage is formed by two O-rings mounted on the inner circumference of the inner casing, the water supplied from a water supply source flows through the complicated flow passage so that it enters into the inner casing at one time and, thereafter, flows through the insides of the O-rings in the axial direction, and flows out again into the gap between the pipe material and the inner casing outwardly in the radial direction.

This increases the number of the parts constituting the water passages and also makes the construction of the assembly of these parts extremely complicated. Moreover, it is necessary to further dispose one more hollow casing within the inner casing to constitute the mixing water passage. In addition, the hot water flows over the entire circumference of the pipe material although it flows partially and, therefore, the problem of the danger of a scald has not yet been solved.

In the hot and cold water mixing device described in FIG. 2 of the above-mentioned U.S. Pat. No. 4,381,073, since the hot water passage is not formed over the entire circumference of the pipe material, the problem of the danger of a scald is solved. However, the water passages are complicated, like those described above, and the number of parts which constitute the mixing device is large.

For this reason, there is a problem in that the strict accuracy of finishing and assembly of each component is required and, therefore, the finishing and assembly of the hot and cold water mixing device are difficult. Further, there is a problem in that forming large water holes is necessary to adjust the offsets between the openings of the pipe material and the water holes of the inner casing, thereby decreasing the strength of the inner casing. Moreover, there is another problem in that because of the complicated fluid passages, the positions where the hoses for faucet and shower connected to the mixed water passage are provided are limited and, accordingly, changes in their positions according to the use are difficult. In addition, since the fluid passages are formed by a combination of a number of circumferential seals (O-rings), there is a problem in that operations of incorporating seals are troublesome and difficult and, simultaneously, when a phenomenon of water hammer occurs, leakage from the seals is apt to arise.

The present invention has been made taking such points into consideration, and aims at providing a hot and cold water mixing device which is better in the entire thermal balance, simple in construction, and easy to finish and assemble.

Further, the present invention aims at providing a hot and cold water mixing device which allows the positions of arrangement of the hoses for faucet and shower to be adjusted in a relatively easy manner according to the use and situation.

Moreover, the present invention aims at providing a hot and cold water mixing device which is easy in the adjustment of the offsets of the openings provided on both the inner housing and the outer housing.

DISCLOSURE OF INVENTION

In order to achieve the above-mentioned object, the present invention comprises an outer housing having openings which communicate with a hot water supply passage, a cold water supply passage and a mixed water delivery passage; a hollow inner housing which is inserted into the outer housing with a vacant space remaining therebetween and on which two primary water holes communicating with the hot water supply passage and the cold water supply passage, respectively, and a secondary water hole communicating with the mixed water delivery passage are formed passing through the wall of the hollow inner housing from the outer surface thereof; and insulating members for forming fluid passages within the vacant space between the outer housing and inner housing, which enclose at least one water hole communicating with the hot water supply passage among the two primary water holes, and the secondary water hole, respectively, and which each are partly arranged in the direction intersecting with the circumferential line of the inner housing.

Further, in a preferred form of the present invention, the water holes each are enclosed by the insulating member which is non-circular in form.

Moreover, in a preferred form of the present invention, the insulating members are of forms different in the dimensions at the right and left direction and in the up and down direction intersecting perpendicularly to each other.

In addition, in a preferred form of the present invention, the insulating members each include at least partly a rectilinear portion.

In a further preferred form of the invention, the rectilinear portion extends substantially parallel to the axial direction of the inner housing.

In a further preferred form of the invention, the water hole is formed in a non-circular shape passing through the wall.

Further, in a preferred form of the invention, the water holes each are of the form different in the dimensions of opening at the right and left direction and in the up and down direction intersecting perpendicularly to each other.

Moreover, in a preferred form of the invention, the water holes each include at least partly a rectilinear portion.

In a further preferred form of the invention, the insulating members consist of seal members having elasticity.

In a further preferred form of the invention, the respective insulating members are arranged so that one of the insulating members is disposed at a position displaced from a position, where it is facing with the other insulating member, in a section intersecting perpendicularly to the axis of the inner housing.

In a further preferred form of the invention, the insulating members are mounted on the outer surface of the inner housing.

Further, in a preferred form of the invention, means for controlling the fluid which flows into and out of the inner housing through the respective water holes thereof is provided within the inner housing.

Moreover, in a preferred form of the invention, the controlling means is of a cartridge-type construction.

In a further preferred form of the invention, the outer housing is provided with an insertion opening for inserting and disposing the inner housing from the outside.

Further, in a preferred form of the invention, the insertion opening of the outer housing is used also as a communicating hole for an operating part for operating a fluid controlling means.

Moreover, in a preferred form of the invention, the outer housing is made of a pipe material.

In a further preferred form of the invention, the outer housing consists of a tubular member formed by forging.

In a further preferred form of the invention, the inner housing is provided, as water holes, with a hot water inlet hole, a cold water inlet hole and a mixed water delivery hole.

Further, in a preferred form of the invention, the insulating members each comprise a hot water insulating member arranged so as to enclose the hot water inlet hole so that it forms a hot water passage, and a mixed water insulating member arranged so as to enclose the mixed water delivery hole so that it forms a mixed water passage.

Moreover, in a preferred form of the invention, the insulating members each comprise a hot water insulating member arranged so as to enclose the hot water inlet hole so that it forms a hot water passage, a cold water insulating member arranged so as to enclose the cold water inlet hole so that it forms a cold water passage, and a mixed water insulating member arranged so as to enclose the mixed water delivery hole so that it forms a mixed water passage.

In a further preferred form of the invention, the mixed water delivery hole comprises first and second mixed water delivery holes which are provided independently from each other.

In a further preferred form of the invention, the hot water inlet hole and first and second mixed water delivery holes each are enclosed by the insulating member.

Further, in a preferred form of the invention, the respective insulating members enclosing the first and second mixed water delivery holes are arranged so that one of the insulating members encloses the other insulating member.

Moreover, in a preferred form of the invention, the second mixed water passage is connected to a shower hose through a shower elbow inserted into the outer housing so as to pass through the wall thereof, the forward end of the shower elbow being removably mounted on the second mixed water passage.

In a further preferred form of the invention, the shower elbow is provided at the forward end thereof with a radially extending projection, and the second mixed water passage is provided at the circumferential edge thereof with a circumferential flange with which the projection of the shower elbow comes into a slidable engagement and which is formed with a cut-out portion which allows the projection to pass through in the axial direction.

In a further preferred form of the invention, the shower elbow is provided at the forward end thereof with a radially extending projection, and the second mixed water passage is provided with a bushing having a circumferential flange with which the projection of the shower elbow comes into a slidable engagement and which is formed with a cut-out portion which allows the projection to pass through in the axial direction.

Further, in a preferred form of the invention, the second mixed water passage is provided between the hot water inlet hole and the cold water inlet hole.

Moreover, in a preferred form of the invention, the inner housing is provided with the hot water inlet hole, cold water inlet hole, hot water delivery hole and cold water delivery hole.

In a further preferred form of the invention, the insulating members comprise a hot water insulating member arranged so as to enclose the hot water inlet hole so that it forms a hot water passage, and a mixed water insulating member arranged so as to enclose the hot and cold water delivery holes together so that it forms a mixed water passage.

In a further preferred form of the invention, the insulating members comprise a hot water insulating member arranged so as to enclose the hot water inlet hole so that it forms a hot water passage, a cold water insulating member arranged so as to enclose the cold water inlet hole so that it forms a cold water passage, and a mixed water insulating member arranged so as to enclose the hot water delivery hole and the cold water delivery hole together so that it forms a mixed water passage.

Further, in a preferred form of the invention, the mixed water insulating member is formed at least integrally with the hot water insulating member.

Moreover, in a preferred form of the invention, sealing members for sealing the vacant space between the inner housing and the outer housing are mounted on both ends of the inner housing.

In a preferred form of the invention, the sealing members are formed integrally with at least one of the hot water insulating member and the mixed water insulating member.

Further, in a preferred form of the invention, the sealing members are integrally formed with the outer surface of the inner housing.

Moreover, in a preferred form of the invention, the mixed water insulating member is arranged within a range smaller than half the outer circumference of the inner housing.

In a further preferred form of the invention, the inner housing is formed of a synthetic resin material.

In a further preferred form of the invention, the inner housing is integrally formed, on the outer surface thereof, with holding parts having concave grooves for mounting the insulating members.

Further, in a preferred form of the invention, the holding parts for mounting the insulating members are provided so as to protrude from the outer surface of the inner housing, and one or more ribs each having an inclined portion are connected to the lateral surfaces of the holding parts parallel to the axial direction.

Moreover, in a preferred form of the invention, the inner housing is formed therein with a control means-accommodating part.

Further, in order to achieve the above-mentioned object, the present invention is characterized in that it comprises the steps of forming a hollow inner housing with two primary water holes communicating with a hot water supply passage and a cold water supply passage, respectively, and a secondary water hole communicating with a mixed water delivery passage by passing through the wall from the outer surface side; enclosing the water hole communicating at least with the hot water supply passage among said two primary water holes and the secondary water hole, using insulating members which each are partly arranged in the direction of intersection with the circumferential line of the inner housing; and inserting said inner housing into the hollow outer housing having the openings communicating with the hot water supply passage, cold water supply passage and mixed water delivery passage, respectively, thereby forming fluid passages within the vacant space between the inner housing and the outer housing.

In addition, in a preferred form of the invention, the water holes are enclosed in the forms of non-circles by the insulating members to form fluid passages.

Moreover, in a preferred form of the invention, the water holes are enclosed by the insulating members having rectilinear portions extending substantially parallel to the axis of the inner housing to thereby form fluid passages.

According to the present invention, the primary water hole communicating at least with the hot water supply passage among the two primary water holes formed on the inner housing so as to pass through the wall thereof and the secondary water hole, are enclosed by means of insulating members which each are partly arranged in the direction intersecting with the circumferential line of the inner housing, and the inner housing is inserted into the outer housing to thereby form fluid passages within the vacant space between the inner housing and the outer housing. Accordingly, with the present invention, hot water supplied from the hot water supply passage is transferred within the inner housing in a situation of being insulated by the insulating members so as to flow only within a predetermined range. In addition, since the insulating members each are partly arranged in the direction of intersection with the circumferential line of the inner housing, water supplied from the cold water supply passage can be directed along the outer edges of the insulating members in the direction of intersection with the circumferential line of the inner housing. Alternatively, in the case where the primary water hole of the inner housing communicating with the cold water supply passage also is enclosed by the insulating member, air or a heat insulating member exists within the vacant space between the inner housing and the outer housing; however, this vacant space is also formed along the outer edge of the insulating member in the direction of intersection with the circumferential line of the inner housing.

This allows a heat insulating material such as water or air to be transferred in the direction of intersection with the circumferential line of the inner housing along the insulating member without forming any particular passage within the inner housing to make a detour passing radially inward of the insulating member.

Therefore, the present invention allows hot water to be insulated within a predetermined, for example, narrow region to thereby prevent the temperature of the outer housing from rising too high, and allows a heat insulating material such as water or air to be arranged over a wide range so as to enclose the outer periphery of the inner housing and, simultaneously, such a construction can be simply obtained without forming any particular passage within the inner housing.

Moreover, since in the present invention the secondary water hole communicating with the mixed water delivery passage is enclosed by the insulating member, a part of which is arranged in the direction of intersection with the circumferential line of the inner housing, the region enclosing the secondary water hole, can be largely formed in the axial direction of the inner housing. Accordingly, the positions of arrangement of a faucet, a shower hose and the like connected to the enclosed region can be selected with a degree of freedom greater in the axial direction.

Further, since in the present invention the regions enclosed by the insulating members can be largely formed in the axial direction of the inner housing, adjustment in the offsets of the openings provided on both the inner housing and the outer housing can be performed in a relatively easy manner.

In addition, an optimum hot and cold water mixing device can be simply constituted according to an application of use and a situation of use by changing the places and forms of arrangement of the insulating members, the number and form of the water holes and the like.

Further, since in the present invention the insulating members enclosing the first and second mixed water delivery holes, respectively, are arranged so that one of the insulating members encloses the other insulating member, the distance of arrangement of the first and second mixed water delivery holes can be shortened, thereby allowing the hot and cold water mixing device to be made compact in size.

Moreover, since in the present invention the forward end of the shower elbow is removably mounted on the second mixed water passage, connection of the shower hose can be easily performed and prevention of the inner housing from coming off can be simply performed.

In addition, since in the present invention one or more ribs having an inclined portion are connected to the side surface of the holding part for mounting the insulating member, parallel to the axial direction, the inner housing with the elastic insulating members mounted thereon can be smoothly inserted and incorporated into the outer housing.

BRIEF EXPLANATION OF DRAWINGS

FIG. 18 is a development showing an inner housing in FIG. 15 with seal members mounted thereon, by developing it in a plain;

FIG. 20 is a front view showing a shower elbow;

FIG. 21 is a front view showing a bush for mounting the shower elbow;

FIG. 23 is an external view of the inner housing with the seal member mounted thereon;

FIG. 24 is a sectional view showing the situation of the inner housing being disposed in a fastening jig;

FIG. 25 is a side view showing the situation of the inner housing being disposed in the fastening jig;

FIG. 26 is a sectional view showing the situation of the inner housing being fastened with the fastening jig;

FIG. 27 is a side view showing the situation of the inner housing being fastened with the fastening jig;

FIG. 28 is an explanative view showing the situation of the inner housing being immersed in a liquid nitrogen together with the fastening jig;

FIG. 29 is an explanative view showing the situation of the frozen inner housing being taken out from the fastening jig;

FIG. 30 is an explanative view showing the situation of the inner housing with the seal members frozen thereon being inserted into the outer housing;

FIG. 31 is an explanative view showing the situation of the seal member being thawed thereafter;

FIG. 38 is a sectional view showing an example of further method for assembling the hot and cold water mixing device according to the invention;

FIGS. 39 to 41 are explanative views showing another method for assembling the hot and cold water mixing device according to the invention, FIG. 39 being an external appearance view showing the situation before assembly;

FIG. 40 is an external appearance view showing the situation of the seal member of the inner housing being compressed;

FIG. 41 is a sectional view showing a method for freezing the seal members remaining compressed;

FIG. 43 is an external perspective view showing the situation of the inner housing being incorporated into the outer housing;

FIG. 44 is an enlarged sectional view of the portion A in FIG. 43 showing the situation of a liquid seal material being injected into the outer housing;

FIG. 45 is an explanative view showing the situation of a liquid seal material being injected into the concave groove of the inner housing; and FIG. 46 is a sectional view, partly in enlarged scale, of the situation of liquid seal material having been injected into the concave groove of the inner housing.

BEST MODE FOR CARRYING OUT THE INVENTION

Embodiments of the present invention will be explained with reference to the drawings.

Figure 1:
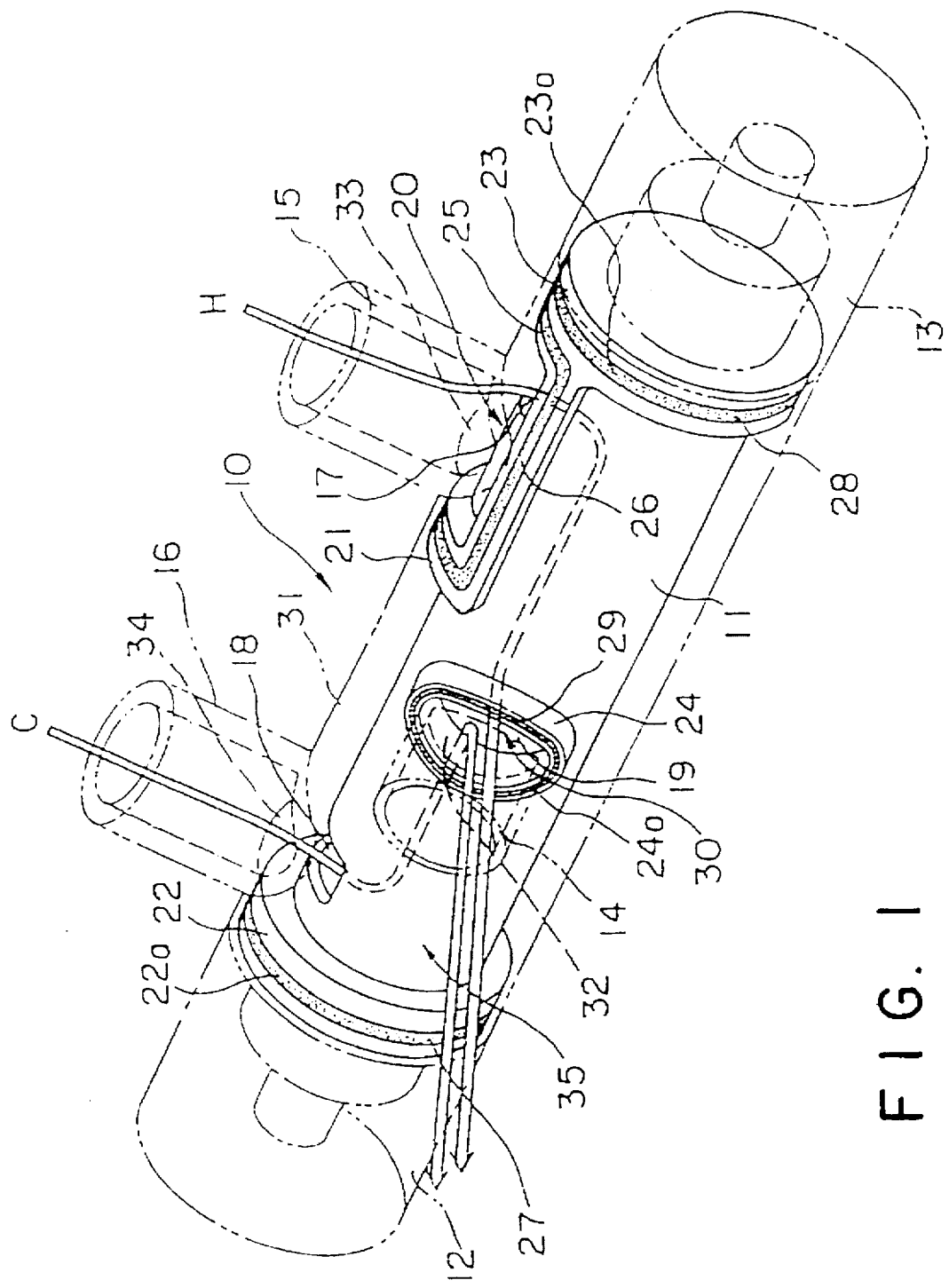
FIG. 1 is an external perspective view showing a first embodiment of the present invention.

FIG. 1 is an external perspective view showing a hot and cold water mixing device 10 according to a first embodiment of the present invention, and reference character 11 indicates an inner housing of a water faucet housing. The inner housing 11 is hollow, preferably hollow cylindrical in form, and is provided therein with a means for controlling the flow of fluid, for example, an opening and closing valve. In the present embodiment, a opening and closing valve for cold water (not shown) is inserted into the inner housing 11 from the left end thereof and arranged therein, and a closing and opening valve for hot water (not shown) is inserted into the inner housing 11 from the right end thereof and arranged therein, referring to FIG. 1, and the opening and closing valves are adapted to be controlled so as to be opened or closed by means of a cold water handle 12 and a hot water handle 13 fitted to the outside of the inner housing 11.

A hot water inlet hole 17 communicating with a hot water supply passage 15, a cold water inlet hole 18 communicating with a cold water supply passage 16 and a mixed water delivery hole 19 communicating with the mixed water delivery passage 14 are formed on the inner housing 11 so as to pass through the wall thereof from the outside. The hot water inlet hole 17 and cold water inlet hole 18 are formed, for example, on the back face of the inner housing corresponding to the positions of the hot water supply passage 15 and the cold water supply passage 16, and the mixed water delivery hole 19 is formed on the lower side of the side facing a user using the hot and cold water mixing device, for example, on the lower face of the inner housing 11. Further, the hot water inlet hole 17 and the cold water inlet hole 18 are in the form of a non-circle, for example, a square enclosed by the rectilinear portions extending in the direction of axis and in the direction of intersection at a right angle thereto, and the mixed water delivery hole 19 is substantially cylindrical in form. Besides, the forms of the water holes consisting of these inlet holes and the delivery hole can be changed as occasion demands, i.e., any one of the hot water inlet hole 17 and the cold water inlet hole 18 may be in the form of a circle or a non-circle other than a square, and further, the mixed water delivery hole 19 may be in the form of a non-circle, for example, a square.

On the outer periphery of the hot water inlet hole 17 is formed a seal-holding part 21 projecting radially so as to enclose the hot water inlet hole 17. Moreover, also at both ends of the inner housing 11 are formed seal-holding parts 22 and 23 circumferentially. These seal holding parts 21, 22 and 23 are each in the form of, for example, a circular arc-like section (a circle-like section in the case of the seal-holding parts 22 and 23) corresponding to the form of the inner wall surface of the outer housing 31 so as to extend along the inner wall surface of the outer housing 31 with a minute clearance therebetween as the inner housing 11 is inserted into the outer housing 31, as will be described later.

On the outer periphery of the mixed water delivery hole 19 is formed a substantially circular seal holding part 24 projecting so as to enclose the mixed water delivery hole 19. This seal-holding part 24 is also in the form of, for example, a circular arc in the section intersecting at a right angle to the axis, corresponding to the form of the inner wall surface of the outer housing 31.

In the seal-holding part 21 enclosing the hot water inlet hole 17 is formed a concave groove 25 which is continuous so as to enclose the hot water inlet hole 17, and a member having elasticity, for example, a seal member 26 made of rubber or synthetic resin is inserted in the concave groove 25 so as to form a closed loop.

In the present embodiment, the seal member 26 is in the form of a non-circle, for example, so as to partially have rectilinear portions extending parallel to the axial direction. Further, the dimension of the radially outer ends of the seal member 26 is formed slightly larger than the dimension of the inner wall surface of the outer housing 31; so, when the inner housing 11 is inserted into the outer housing 31, the seal member 26 is elastically deformed to come into an abutting engagement with the inner wall surface of the outer housing 31, thereby allowing the hot water inlet hole 17 to be securely sealed at the outer peripheral edge of the seal-holding part 21.

Moreover, in the seal holding parts 22 and 23 at both ends of the inner housing 23 are formed concave grooves 22a and 23a circumferentially, in which seal members 27 and 28 (for example, the O-rings made of rubber) having elasticity are inserted.

Further, on the end surface of the seal holding part 24 enclosing the mixed water delivery hole 19 is formed a substantially circular concave groove 24a so as to enclose the mixed water delivery hole 19, and a seal member 29 having elasticity is inserted into the concave groove 24a with the condition similar to the above-mentioned seal member 26.

The inner housing 11 with the seal members 26, 27, 28 and 29 being mounted on the outer surface thereof is inserted into and fixed to the hollow, for example, hollow cylindrical outer housing 31.

The outer housing 31 is provided with a hot water inlet opening 33, a cold water inlet opening 34 and a mixed water outlet opening 32, corresponding to the hot water supply passage 15 connected to a hot water supply source (not shown), the cold water supply passage 16 connected to a cold water supply source (not shown) and the mixed water delivery passage 14 connected to a faucet (not shown), respectively.

A hollow cylindrical tubular member made of metal can be used as this outer housing 31. For this tubular member, for example, a tubular member formed by forging, a tubular member formed by casting or the like may be used in addition to the one made of a pipe material. Use of the pipe material and the tubular member formed by forging results in remarkably little surface roughness on the inner wall surface of the housing, as compared with the conventional housing made by casting and, therefore, the operation of finishing the surface of the portions, with which the seal members come into an abutting engagement, becomes easy.

The inner housing 11 with the seal members 26, 27, 28 and 29 mounted thereon is inserted into the outer housing 31 and fixed at a predetermined position, so that predetermined fluid passages are formed in the vacant space between the outer housing 31 and the inner housing 11.

Namely, in the space enclosed by the seal member 26 is formed a hot water passage 20, which communicates with the hot water inlet opening 33 of the outer housing 31 and the hot water inlet hole 17 of the inner housing 11.

Further, in the space enclosed by the seal member 29 is formed a mixed water passage 30, which communicates with the mixed water outlet opening 32 of the outer housing 31 and the mixed water delivery hole 19 of the inner housing 11.

Moreover, in the space, which is sandwiched by the seal members 27 and 28 and which is outside the regions enclosed by the seal members 26 and 29, is formed a cold water passage 35, which communicates with the cold water inlet opening 34 of the outer housing 31 and the cold water inlet hole 18 of the inner housing 11.

As shown in FIG. 1, the cold water passage 35 in the present embodiment is formed in the wide space portion extending over in both the axial direction and the circumferential direction except for the hot water passage 20 and mixed water passage 30 which are limited to the relatively narrow regions. Accordingly, the cold water which has flowed therein from the cold water inlet opening 34 fills over the wide portion in the space formed between the outer casing S1 and the inner housing 11. This prevents the outer surface of the hot and cold water mixing device 10 from becoming a too high temperature and allows the thermal balance of the entire mixing device 10 to be kept better.

According to the present embodiment, the hot water supplied from the hot water supply passage 15 flows by way of the hot water inlet opening 33, hot water passage 20 and hot water inlet hole 17 into the inner housing 11, and operating the hot water handle 13 to open the opening and closing valve for hot water allows the hot water to flow into the mixing chamber (not shown) formed within the inner housing 11. Meanwhile, the water supplied from the cold water supply passage 16 flows by way of the cold water inlet opening 34, cold water passage 35 and cold water inlet hole 18 into the inner housing 11, and operating the cold water handle 12 to open the opening and closing valve for cold water allows the cold water to flow into the mixing chamber.

The mixture of hot and cold water mixed in the mixing chamber flows by way of the mixed water delivery hole 19, mixed water passage 30 and mixed water outlet opening 32 out of the mixed water delivery passage 14. The temperature of the mixed water can be regulated by operating the hot water handle 13 and the cold water handle 12 to adjust a ratio of the hot and cold water being mixed.

Since, according to the present embodiment, the hot water passage 20 and the mixed water passage 30 are formed by the seal members 26 and 29 arranged in the direction of intersection with the circumferential direction of the inner housing 11, the cold water passage 35, which reaches axially from one end to the other end in the space between the outer housing 31 and the inner housing 11 and which extends over the wide region circumferentially, can be simply and easily formed without forming any particular passage within the inner housing 11.

Further, since the hot water passage is formed by the seal member 26 having the portions extending rectilinearly in the axial direction, the axial dimension of the hot water passage 20 can be enlarged without making the radial dimension large. This facilitates axial alignment of the hot water inlet hole 33 of the outer housing 31 with the hot water passage 20, and facilitates the finishing and assembly operations of the outer housing 31 and the inner housing 11. Moreover, not making the radial dimension large allows the hot water passage 20 to be limited to the back side (normally the wall side for fitting) of the mixing device 10, thereby providing an advantageous effect of preventing the scalding of an operator.

If the inner housing 11 is formed using synthetic resin having a heat resistant property, for example, Engineering Plastics such as PPS or the like, it can be light in weight and the cost for production can be greatly reduced, compared with the conventional housing made of casting. Further, the positions and forms of the seal-holding parts 21, 22, 23 and 24 can be designed in a relatively free manner in a single member without dividing the component part into two or more parts, and machining the grooves for inserting the seal members is also easily performed.

Figure 2:
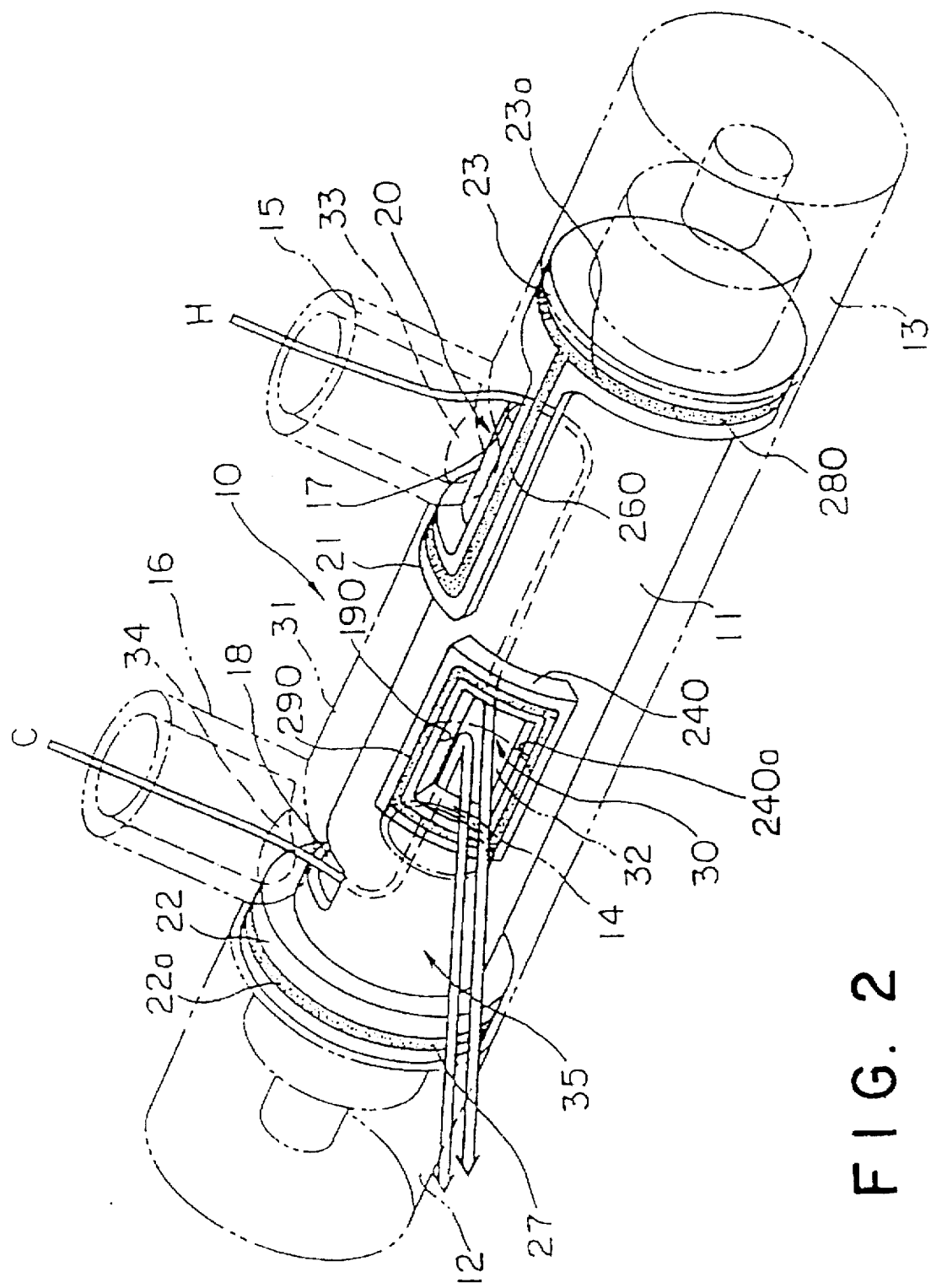
FIG. 2 is an external perspective view showing a modification of the first embodiment of the invention.

FIG. 2 is an external perspective view showing a modification of the embodiment shown in FIG. 1. In this modification, a seal member 260 for forming the hot water passage 20 and a seal member 280 for sealing the end are integrally formed in a continuous manner with each other. A seal-holding part 240 forming the mixed water passage 30 is in the form of a rectangle which is long in the axial direction, and a substantially rectangular concave groove 240a is formed on the seal holding part 240 and has a seal member 290 inserted therein. Also, a mixed water delivery hole 190 is in the form of a rectangle which is long in the axial direction.

Since, in this modification, the seal members 260 and 280 are integrally formed, forming the seal member 260 is easy. Moreover, since the mixed water passage 30 is of a long dimension in the axial direction, the connecting position of faucet can be selected more freely in the axial direction.

Figure 3:
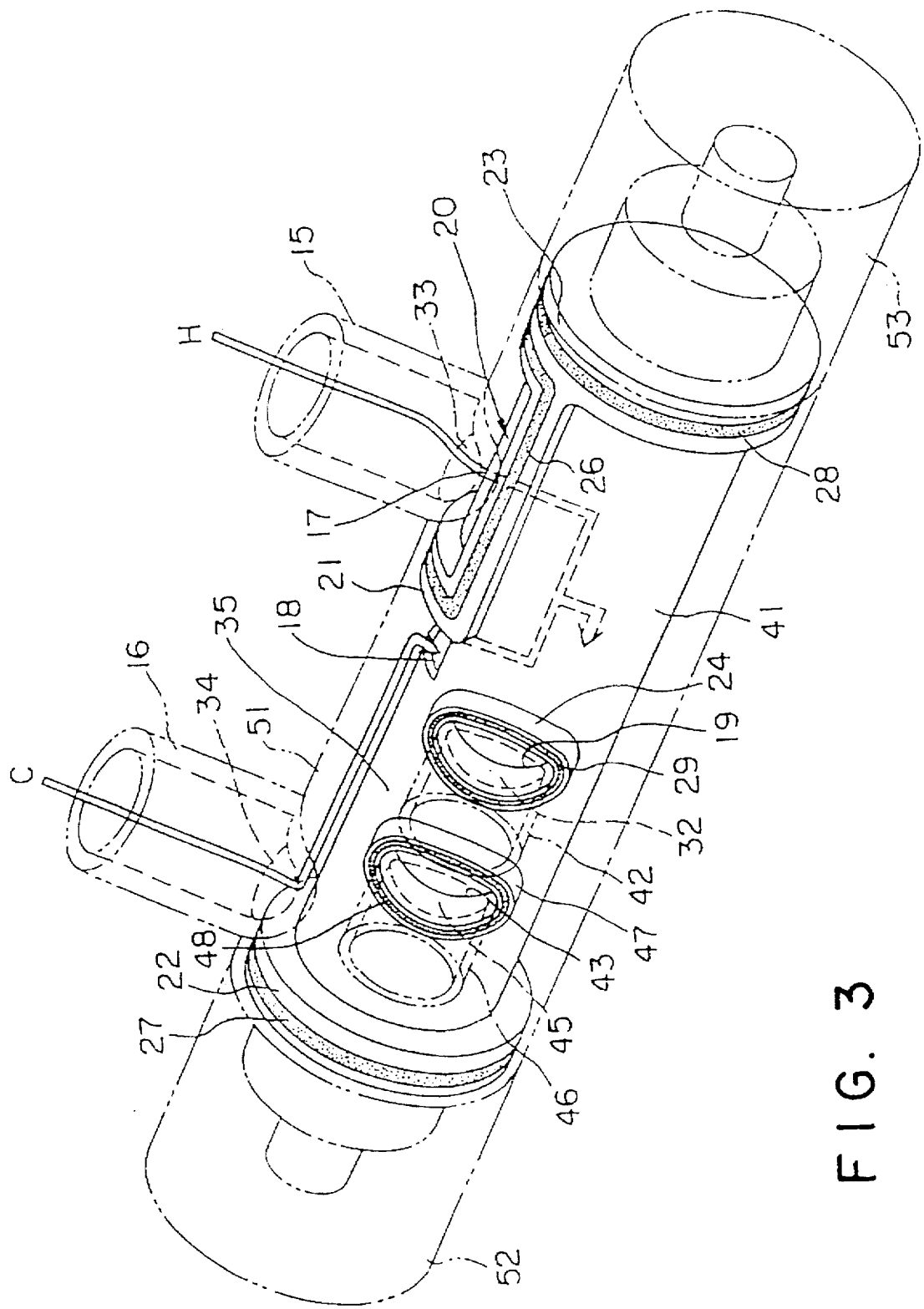
FIG. 3 is an external perspective view showing a second embodiment of the invention.

FIG. 3 is an external perspective view showing a hot and cold water mixing device 40 according to a second embodiment of the present invention. This second embodiment is a modification of the hot and cold water mixing device 10 according to the above-mentioned first embodiment, and the same reference characters indicate the same components and the explanation thereof is omitted.

This embodiment is characterized by the fact that the mixed water delivery holes provided in the inner housing 41 comprise first and second mixed water delivery holes provided independently from each other, and the mixed water outlet openings provided in the outer housing 51 consist of first and second mixed water outlet openings provided independently from each other.

Namely, the first mixed water delivery hole 19 and the first mixed water outlet opening 32 are formed so that they communicate with a mixed water delivery passage 42 for faucet connected to a faucet, in a similar way to the above-mentioned first embodiment. Further, the second mixed water delivery hole 43 and the second mixed water outlet opening 45 are formed so that they communicate with a mixed water delivery passage 46 for shower connected to a mixed water delivery equipment different from a faucet, for example, a shower.

The outer periphery of the first mixed water delivery hole 19 is enclosed by the seal-holding part 24, in which the seal member 29 is inserted, in a similar way to the above-mentioned one.

Further, the outer periphery of the second mixed water delivery hole 43 is enclosed by a seal holding part 47 which is formed so as to protrude from the outer surface of the inner housing 41 outwardly in the radial direction, and a seal member 48 is inserted into the seal holding part 47 so that it continuously encloses the second mixed water delivery hole In the present embodiment, the cold water inlet hole 18 is provided at a position adjacent the hot water inlet hole 17.

In the present embodiment, the mixed water delivery opening is changed to faucet or shower and, simultaneously, an opening and closing changing-over valve (not shown) for performing adjustment in the delivery quantity is arranged at the position corresponding to the first and second mixed water delivery holes 19 and 43 within the inner housing 41. An opening and closing changing-over handle 52 for operating the opening and closing changing-over valve is fitted to the lateral end (the left lateral end in FIG. 3) in the direction of the mixed water delivery passages 42 and 46 of the mixing device 40.

Further, at the position corresponding to the hot water inlet hole 17 and cold water inlet hole 18 within the inner housing 41 is arranged a hot and cold water mixing valve (not shown) for mixing hot and cold water at a predetermined ratio, and a temperature regulating handle 53 for operating the hot and cold water mixing valve is fitted to the other lateral end (the right lateral end in FIG. 3) of the mixing device 40.

According to the present embodiment, the temperature regulating handle 53 can be operated to determine a mixing ratio of hot and cold water corresponding to a desired temperature of the mixed water, and the opening and closing changing-over valve handle 52 is operated to deliver the mixed water at a desired temperature from either the faucet or shower.

According to the present embodiment, the mixed water passage for delivering the mixed water to either the faucet or shower can be simply formed in addition to the abovementioned function and effects of the first embodiment. Moreover, if the mixing valve is constituted using a valve having a function of automatic temperature regulation, the mixed water at a predetermined temperature can always be provided.

Figure 4:
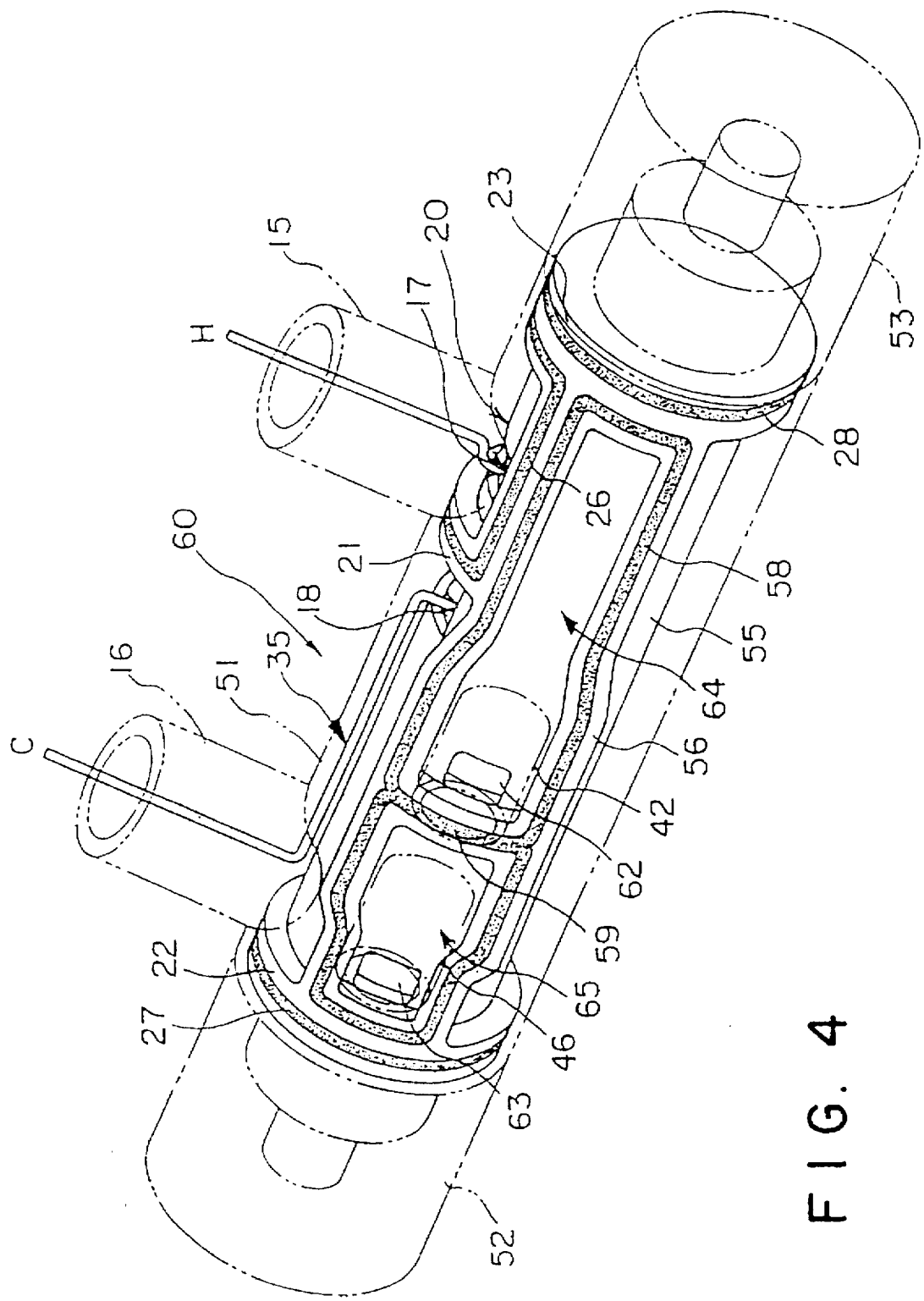
FIG. 4 is an external perspective view showing a third embodiment of the invention.

FIG. 4 is an external perspective view showing a hot and cold water mixing device 60 according to a third embodiment of the invention. This third embodiment is a modification of the above-mentioned second embodiment, and the same component parts are indicated by the same reference characters and the explanation thereof is omitted.

In the present embodiment, the outer peripheries of a first mixed water delivery hole 62 for faucet and a second mixed water delivery hole 63 for shower provided on the inner housing 55 are enclosed by a seal-holding part 56 in the form of a substantially elongated substantially rectangle extending in the axial direction and a circumferential seal-holding part 57 traversing between the first and second mixed water delivery holes 62 and 63.

In these seal-holding parts 56 and 57 are inserted seal members 58 and 59 similarly to the afore-mentioned ones, and in the spaces enclosed by these seal members 58 and 59 are formed first and second mixed water passages 64 and 65, respectively.

Further, these seal members 58 and 59 are disposed in a range smaller than half the outer circumference of the inner housing 55.

Moreover, the first and second mixed water delivery holes 62 and 63 each are of a non-circular form, for example, a substantially rectangular form.

According to the present embodiment, the first and second mixed water passages 64 and 65 can be formed having long dimensions in the axial direction in addition to the aforementioned function and effects of the second embodiment. This allows the connecting positions of the mixed water delivery passage 42 for faucet and the mixed water delivery passage 46 for shower to be determined in a relatively free manner in the axial direction of the mixing device 60 according to the use of application, the request of design, the environment of use and the like.

In addition, axial alignment with the mixed water outlet opening provided on the outer housing 51 is simple, and machining and assembling operations of the inner housing 55 and the outer housing 51 are easily performed.

Further, the first and second delivery holes 62 and 63 are each of a substantially rectangular form which is not a circle and; so, if the openings (not shown) of the opening and closing changing-over valve corresponding to the first and second delivery holes each are substantially in the form of a rectangle which is not a circle, the optimum areas of the openings proportional to flow rates can be more efficiently obtained, as compared with a circular opening.

Moreover, the seal members 58 and 59 are disposed within a range smaller than half the outer circumference of the inner housing 55; so, in the case where a water pressure at the primary side (water pressure from the water supply passage 16) is large or a phenomenon of water hammer occurs, the entire inner housing 55 is displaced toward the seal members 58 and 59, and acts so that the seal members 58 and 59 press against the inner wall of the outer housing 51. Thus, the sealing property due to the seal members 58 and 59 is further strengthened and there is no leakage of water under a high pressure from the mixed water delivery passage.

Figure 5:
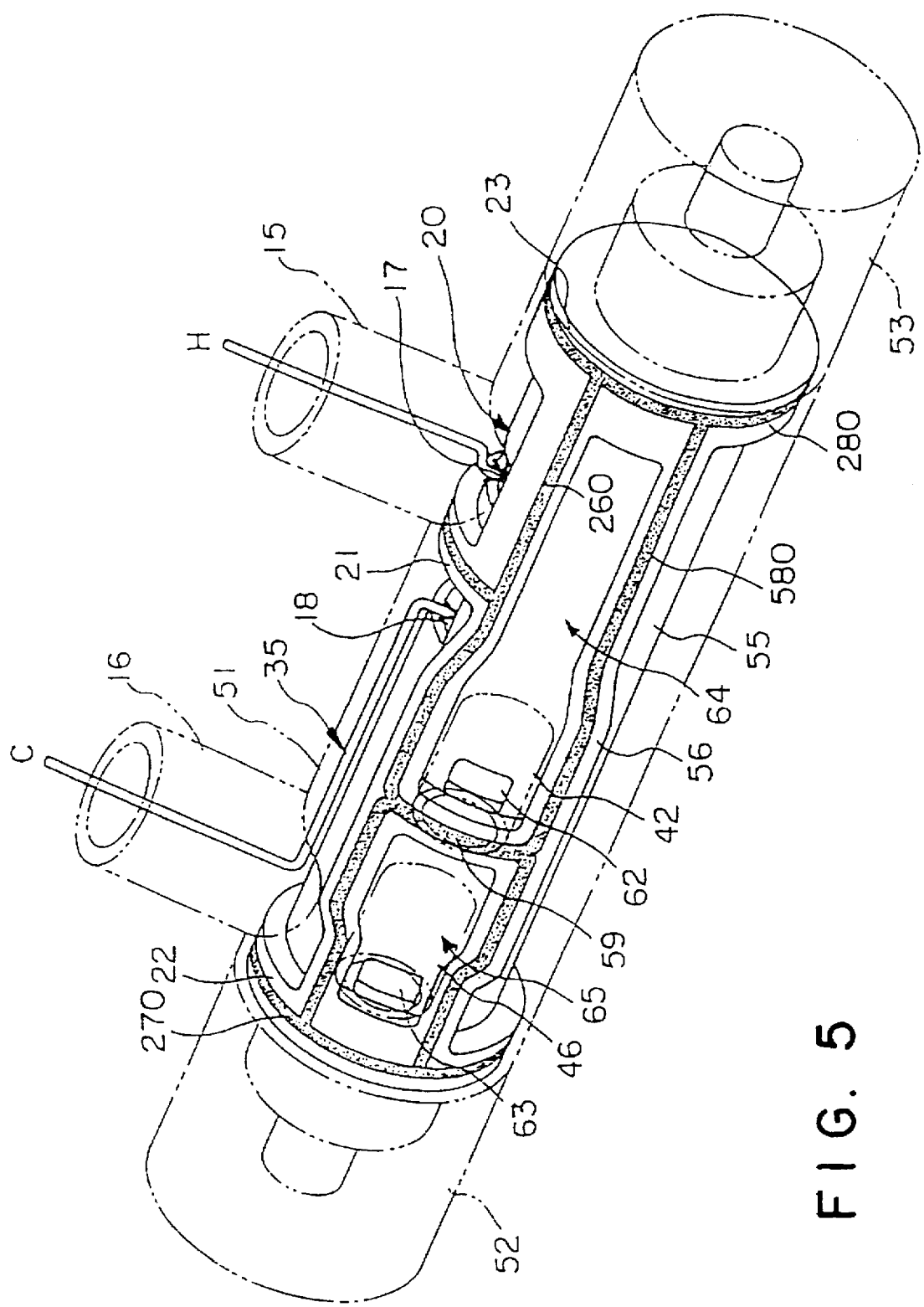
FIG. 5 is an external perspective view showing the third embodiment of the invention.

FIG. 5 is an external perspective view showing a modification of the embodiment shown in FIG. 4. In this modification, a seal member 260 for forming the hot water passage 20, seal members 580 and 59 for forming the first and second mixed water passages 64 and 65, and seal members 270 and 280 for sealing the ends communicate with each other and are integrally formed. Thus, the seal member can be formed at a predetermined position and in a predetermined form, for example, by first flowing the material in a melted condition from one spot and, subsequently, solidifying it, thereby allowing the seal members to be more easily mounted on the inner housing.

FIGS. 6 to 10 are views showing a fourth embodiment of the present invention. In this embodiment, the hot and cold water mixing device 60 shown in the third embodiment is further modified and a more concrete construction is shown.

Figure 6:
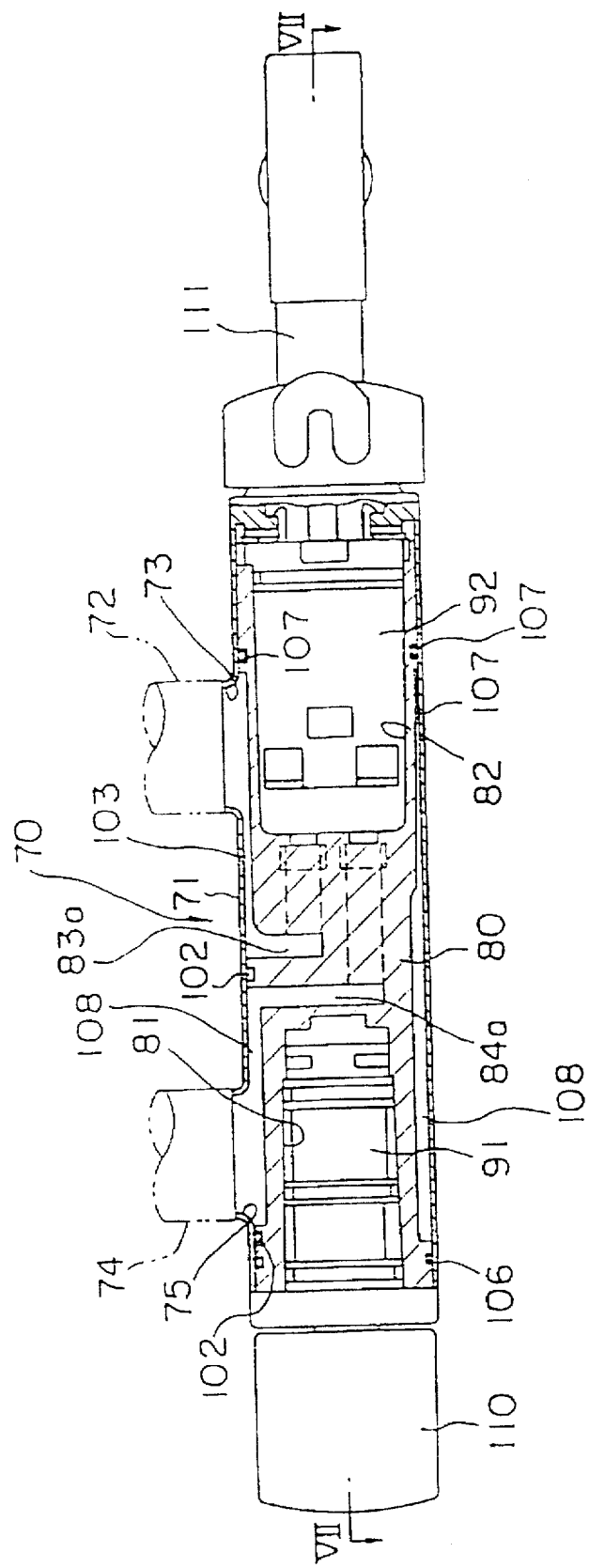
FIG. 6 is a longitudinal sectional view showing a fourth embodiment of the invention.
Figure 7:
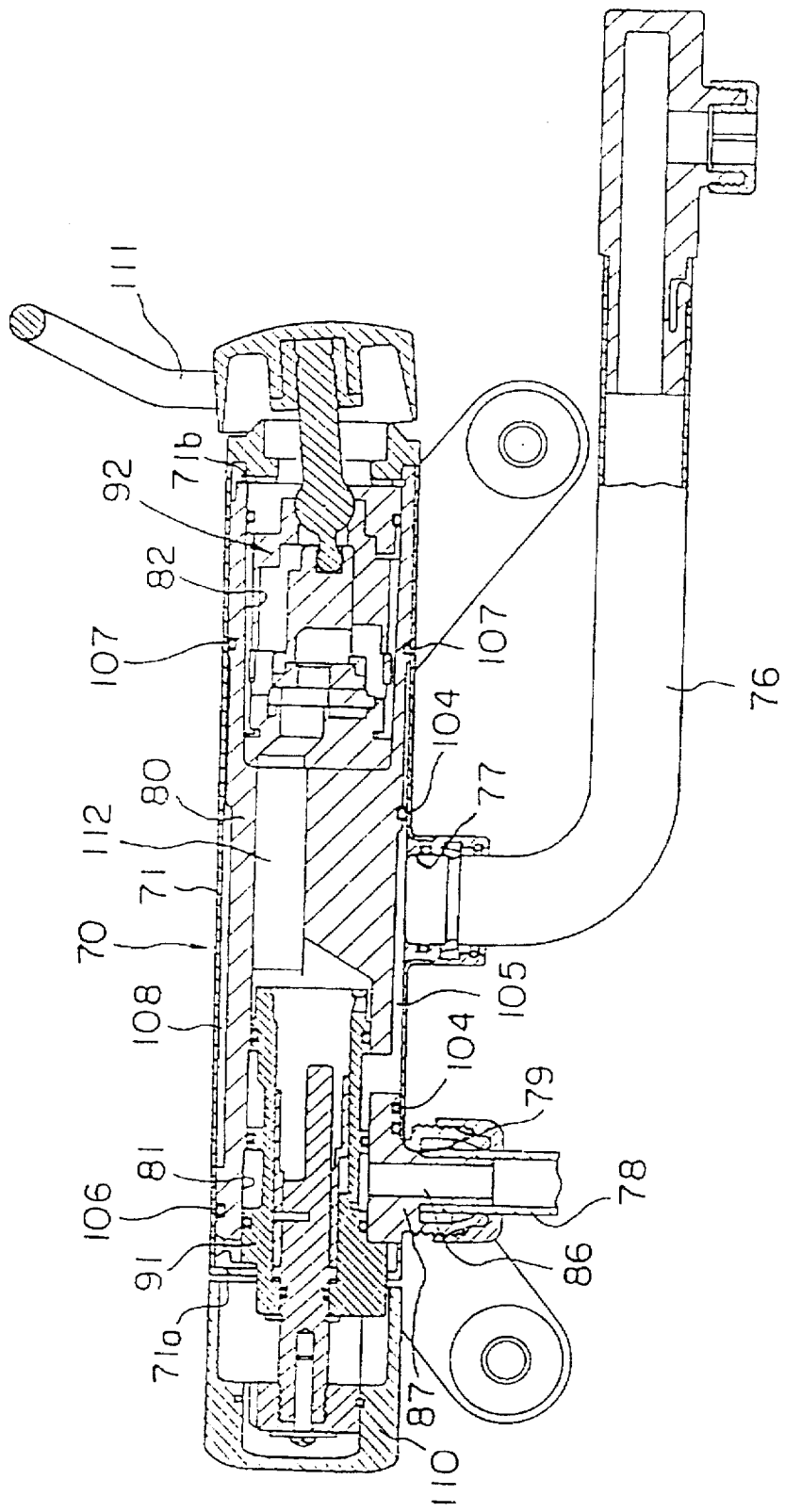
FIG. 7 is a sectional view taken along line VII—VII in FIG. 6.

FIGS. 6 and 7 are longitudinal sectional views showing a hot and cold water mixing device 70 according to the present embodiment. The hot and cold water mixing device 70 comprises, as a main constitution, an hollow cylindrical outer housing 71, a hollow inner housing 80 housed and disposed in the outer housing 71, a valve 91 for changing over to faucet or shower which is inserted into the inner housing 80 from one end thereof, and a single lever valve unit 92 inserted into the inner housing 80 from the other end thereof.

The outer housing 71 is formed by a metal tubular member, for example, such as a metal pipe, and is provided on its outer surface with a cold water inlet opening 73 communicating with a cold water supply passage 72, a hot water inlet opening 75 communicating with a hot water supply passage 74, a first mixed water outlet opening 77 communicating with a faucet 76, and a second mixed water outlet opening 79 communicating with a shower hose 78. The cold water inlet opening 73 and the hot water inlet opening 75 are normally provided on the side directed to the fitting wall of the mixing device 70, and the first and second mixed water outlet openings 77 and 79 are provided at the position displaced by approximately 90 degrees relative to the above-mentioned openings 73 and 75 (position directed downward when fitted).

Further, the cold water inlet opening 73 and the hot water inlet opening 75 are normally formed at both the left and right ends of the outer housing 71 at a predetermined distance in view of the construction of fitting and holding the mixing device 70 on the wall, the first mixed water outlet opening 77 communicating with the faucet 76 is formed substantially in the middle of the outer housing 71 in view of an easily handling property of the faucet 76, and the second mixed water outlet opening 79 communicating with the shower hose 78 is formed on the side of the valve 91 for changing over to a faucet or a shower.

The outer housing 71 is further provided at least at its one end with an insert opening 71a for inserting the inner housing 80 into the outer housing from the outside. Moreover, the outer housing 71 is also provided at its other end with an opening 71b, through which a lever handle 111 for operating the single lever valve unit 92 described later projects outward.

Moreover, a changing-over valve operating handle 110 for operating the valve 91 for changing over to a faucet or a shower is connected to the valve 91 passing through the insert opening 71a. Thus, the insert openings 71a and 71b provided in the outer housing 71 are used also as the communicating holes of the handles 110 and 111 for operating the control means within the inner housing 80, so that the construction of the outer housing 71 can be further simplified without the necessity of separately providing a communicating hole for the operating handle on the outer housing 71.

Figure 8:
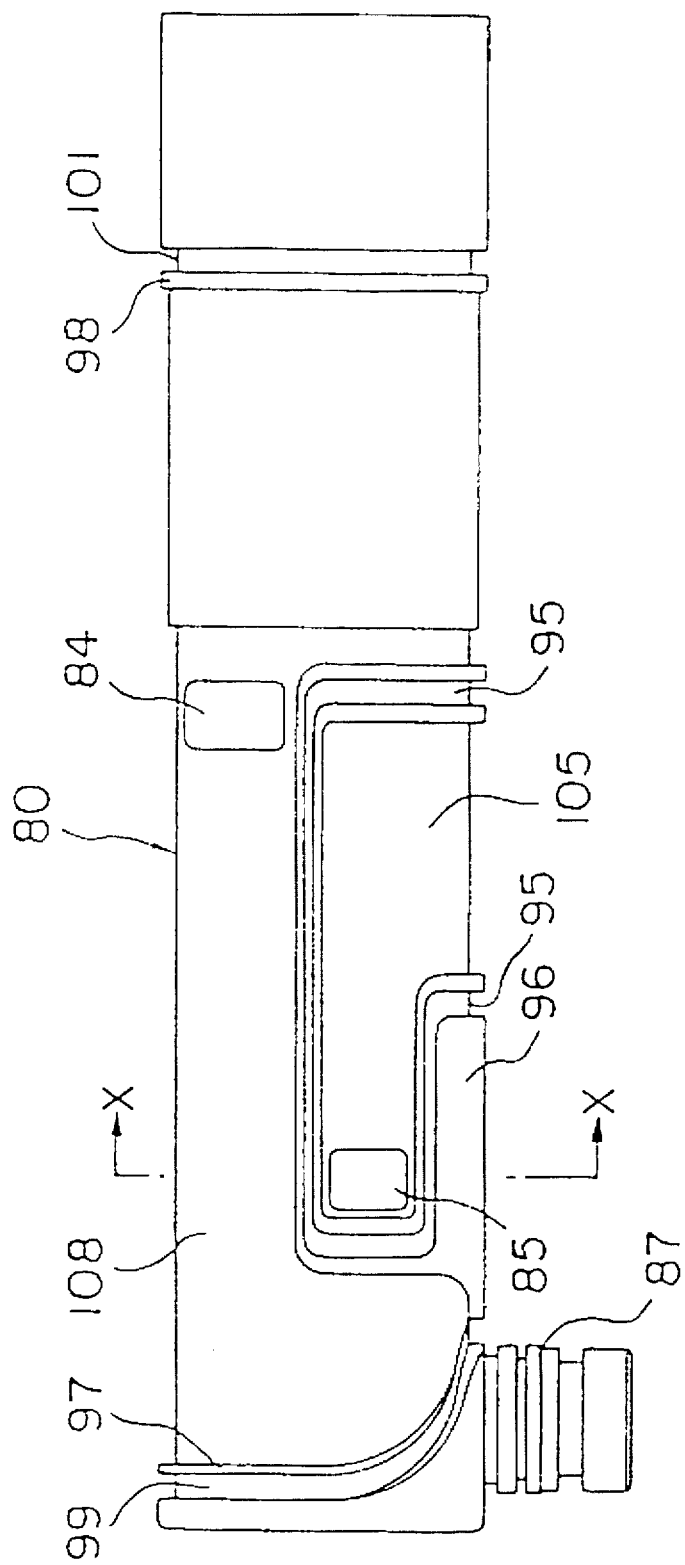
FIG. 8 is a front view showing an inner housing according to the fourth embodiment of the invention.
Figure 9:
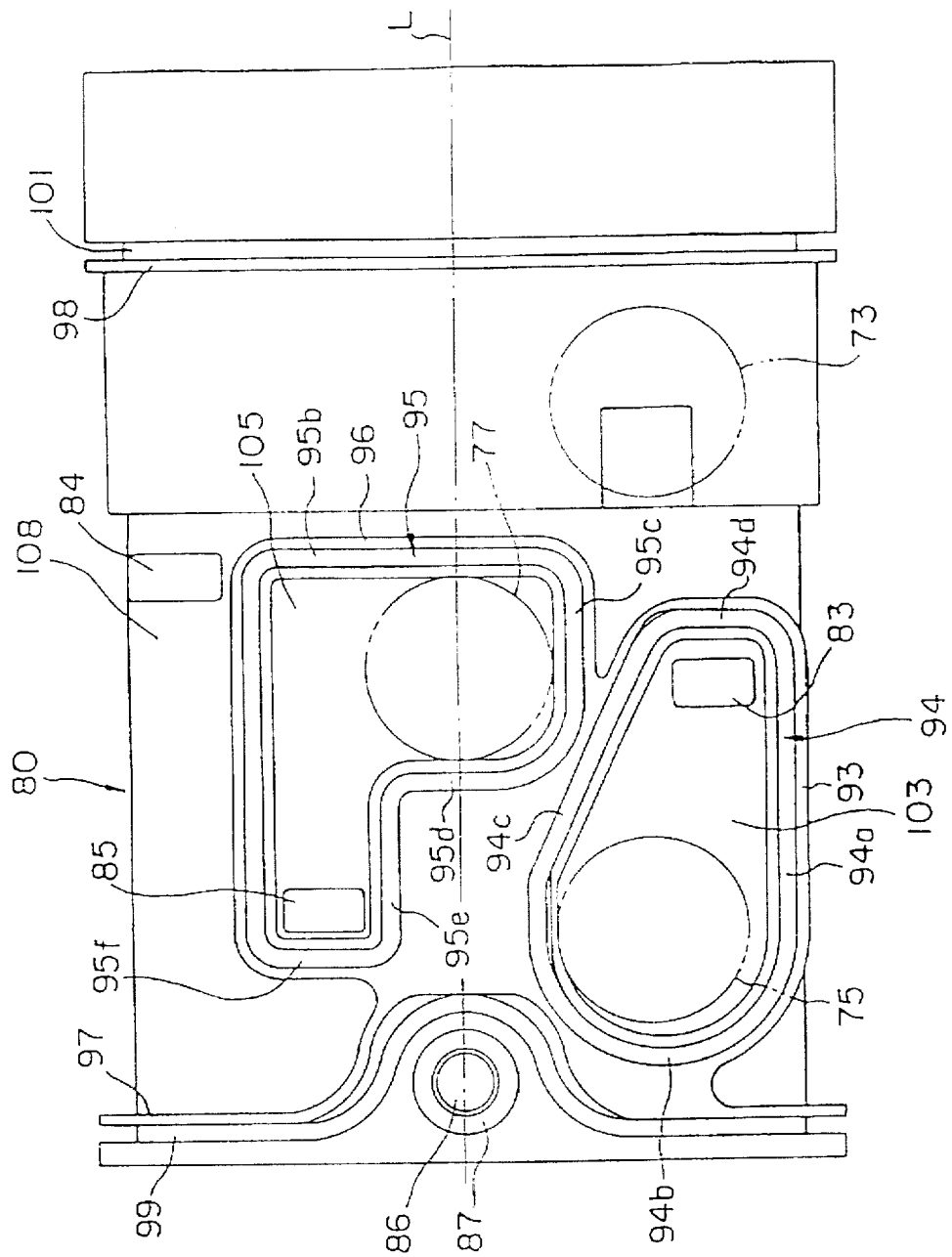
FIG. 9 is a development showing the inner housing in FIG. 8 by developing it in a plane.
Figure 10:
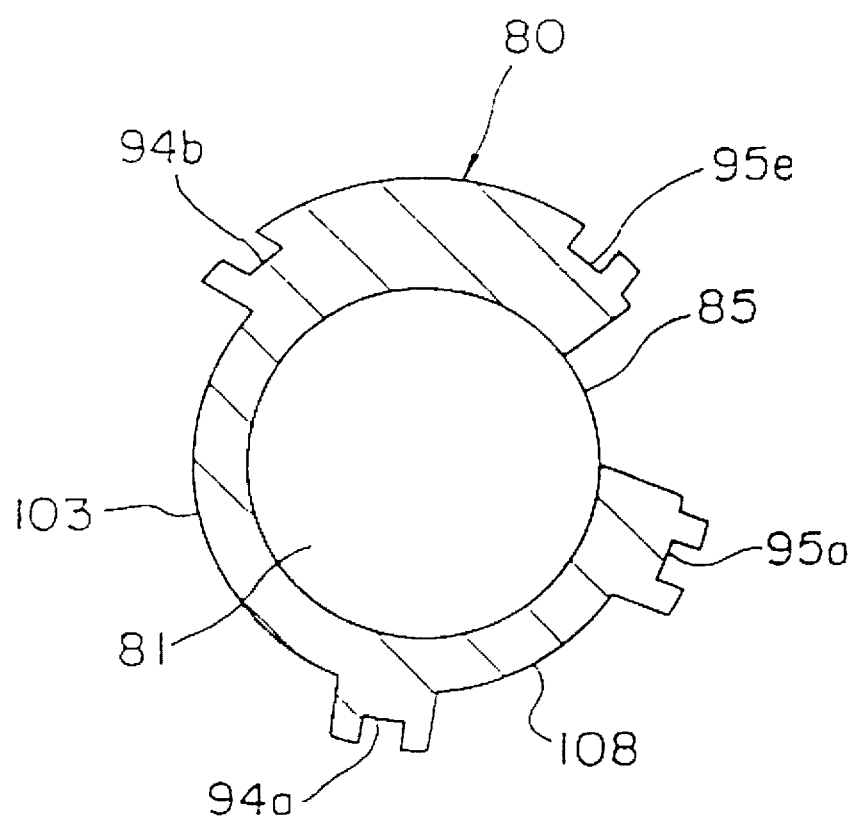
FIG. 10 is a sectional view taken along line X—X in FIG. 8.

FIGS. 8 to 10 are views showing the inner housing 80 in more detail, FIG. 8 being a front view, FIG. 9 being a view shown by developing the inner housing 80 shown in FIG. 8 into a plane, and FIG. 10 being a sectional view taken along line X—X in FIG.8.

The inner housing 80 is substantially cylindrical, and is provided on the outer surface thereof with a region in which fluid passages are formed between the outer housing 71 and the inner housing 80. It is formed therein with spaces 81 and 82 (refer to FIGS. 6 and 7), in which the faucet-shower changing-over valve 91 and the single lever valve unit 92 are inserted, and the spaces 81 and 82 communicate with each other through a communicating passage 112 (refer to FIG. 7) provided within the inner housing 80. These faucet-shower changing-over valve 91 and single lever valve unit 92 are of cartridge construction, so that inserting the valves into the inner housing 80 can be easily performed.

On the outer surface of the inner housing 80 are provided a hot water inlet hole 83, a cold water inlet hole 84, a mixed water delivery hole 85 for faucet, which are each substantially in the form of a rectangle long in the circumferential direction, and a circular mixed water delivery hole 86 for shower. The outer periphery of the hot water inlet hole 83 is enclosed by a seal holding part 93, as shown in FIG. 9, in which a concave groove 94 for inserting a seal member is formed, said concave groove 94 consisting of a rectilinear portion 94a extending toward the left of the axis L, a circular arc portion 94b which continues to the rectilinear portion 94a, a rectilinear portion 94c traversing the axis L obliquely, and a rectilinear portion 94d extending circumferentially.

Moreover, the outer periphery of the mixed water delivery hole 85 for faucet also is enclosed by a seal-holding part 96, in which a concave groove 95 for inserting a seal member is continuously formed, said concave groove consisting of a rectilinear portion 95a extending in the right direction of the axis L, a rectilinear portion 95b extending circumferentially, a rectilinear portion 95c extending in the left direction of the axis L again, a rectilinear portion 95d extending circumferentially, a rectilinear portion 95e extending in the left direction of the axis L and a rectilinear portion 95f extending circumferentially.

The mixed water delivery hole 86 for shower is formed passing through a cylindrical boss 87 provided so as to protrude in the radially outward direction from the outer surface of the inner housing 80 in order to facilitate the connection to the shower hose 78.

Further, at both the left and right ends of the inner housing 80 are formed seal holding parts 97 and 98 continuously in the circumferential direction, in which concave grooves 99 and 101 for inserting seal members to seal both the left and right ends of the inner housing 80 are formed.

These seal holding parts 93, 96, 97 and 98 are preferably formed integrally with the inner housing 80 on the outer surface of the inner housing 80.

Referring to FIGS. 8 and 7, the concave groove 99 formed at the left end continues in the circumferential direction making a detour partly around the cylindrical boss 87, and the concave groove 101 formed at the right end is a circular one in which an O-ring as a seal member can be inserted.

Seal members are inserted into the concave grooves 94, 95, 99 and 101 of the inner housing 80 and, subsequently, the inner housing 80 is inserted into and fixed to the outer housing 71, so that desired fluid passages are formed in the regions enclosed by the respective seal members.

Namely, a hot water passage 103 is formed by the seal member 102 inserted into the concave groove 94, and the mixed water passage 105 for faucet is formed by the seal member 104 inserted into the concave groove 95. Further, in the region existing outside the seal members 102 and 104 and in the space sandwiched by the seal members 106 and 107 which are inserted into the concave grooves 99 and 101, is formed a cold water passage 108.

This cold water passage 108 is formed over a wide range in both the direction of axis L and the circumferential direction of the inner housing 80, as is apparent from the drawings, and cold water flows into the cold water passage 108 so that the thermal balance of the mixing device 70 is kept better, in a similar way to the afore-mentioned embodiment.

As shown in FIG. 9 with a two-dot chain line, when the inner housing 80 is inserted into the outer housing 71, the hot water inlet opening 73 provided on the outer housing 71 is positioned in the vicinity of being enclosed by the circular arc portion 94b of the seal member within the hot water passage 103.

Further, the hot water inlet opening 75 is positioned in the vicinity of the opposite end spaced at a predetermined distance from the cold water inlet opening 73 and on the same axis as the cold water inlet opening 73.

Moreover, the mixed water outlet opening 77 for faucet is positioned substantially at the middle in the axial direction of the mixing device 70 and at a position displaced by 90 degrees relative to the positions of the cold and hot water inlet openings 73 and 75.

Besides this, the cylindrical boss 87 to be connected to the shower hose 78 projects in the radially outward direction from the outer housing 71.

Thus, according to the present embodiment, the hot water inlet hole 83, cold water inlet hole 84 and mixed water delivery hole 85 for faucet can be provided at the positions on the outer surface of the inner housing 80 away from the positions of the cold water inlet opening 73, hot water inlet opening 75 and mixed water outlet opening 77 of the outer housing 71 determined from a fitting position on the wall and a mode of use of the mixing device 70, in addition to the effects due to the afore-mentioned embodiment. This allows the hot water inlet hole 83, cold water inlet hole 84 and mixed water delivery hole 85 for faucet to be provided at the optimum positions and with the optimum forms and dimensions, corresponding to the construction of the faucet-shower changing-over valve 91, single lever valve unit 92 or the like inserted into the inner housing 80.

If the forms of the fluid passages are made long in the axial direction, a wide area of fluid passages can be provided while preventing any high temperature portion from being produced on the operating side. This is effective in that the flow rate in the fluid passages is decreased and a turbulent flow and a pressure loss are prevented. Further, as the faucet-shower changing-over valve 91 and the single lever valve unit 92, widely known ones can be used, which are operated by means of a changing-over valve operating handle 110 and a lever handle 111, respectively.

According to the present embodiment, the hot water supplied from the hot water supply passage 72 flows through the cold water inlet opening 73, hot water passage 103 and hot water inlet hole 83, and into the hot water inlet passage 83a formed within the inner housing 80 in communication with the hot water inlet hole 83, further flowing into the single lever valve unit 92.

On the other hand, the cold water supplied from the cold water supply passage 74 flows into the cold water inlet passage 84a which communicates with the hot water inlet opening 75, cold water passage 108 and cold water inlet hole 84, subsequently flowing into the single lever valve unit 92.

Operating the lever handle 111 causes the hot and cold water to be mixed within the valve unit 92 in a mixing ratio corresponding to a desired temperature of the mixed water, and the mixed water is sent to the faucet-shower changing-over valve 91 passing through the communicating passage 112. Further, operating the operating handle 110 causes the mixed water to be discharged from the faucet 16 or the shower hose 78.

In the present embodiment, the seal members having the rectilinear portions extending in the axial direction are used as the seal members 102 and 104 forming the hot water passage 103 and the mixed water passage 105, however, it is possible to suitably change the forms of these seal members 102 and 104 according to the forms of the fluid passages 103 and 105 to be formed.

Since, in the present embodiment, the seal member 104 forming the mixed water passage 105 is arranged within a range smaller than half the outer circumference of the inner housing 80, even if a large pressure due to a phenomenon of water hammer is produced within the water passage 108, the inner housing 80 is radially moved in the direction of the mixed water passage 105, thereby pressing the seal member 104 strongly against the inner wall surface of the outer housing 71. This prevents the cold water within the cold water passage 108 from leaking to the mixed water passage 105.

Moreover, according to the present embodiment, the seal member 102 for forming the hot water passage 103 and the seal member 104 for forming the mixed water passage 105 are disposed at the positions displaced by substantially 90 degrees relative to each other. Accordingly, when the inner housing 80 is inserted into the outer housing 71, the seal members 102 and 104 can be held in a precisely positioned condition without any damage thereto. Namely, in the case where these seal members 102 and 104 are disposed at the opposite positions displaced by 180 degrees relative to each other in a section of intersecting perpendicularly to the axis L, when the inner housing 80 is inserted into the outer housing 71, the seal member 102 for forming the hot water passage is radially pressed by the seal member 104 for forming the mixed water passage during its inserting operation, causing its portion to enter into the cold water inlet opening 73 or the hot water inlet opening 75 of the outer housing 71. With this condition, if the inner housing 80 is further axially moved within the outer housing 71, there is a danger of damage to the seal member 102.

Figure 11:
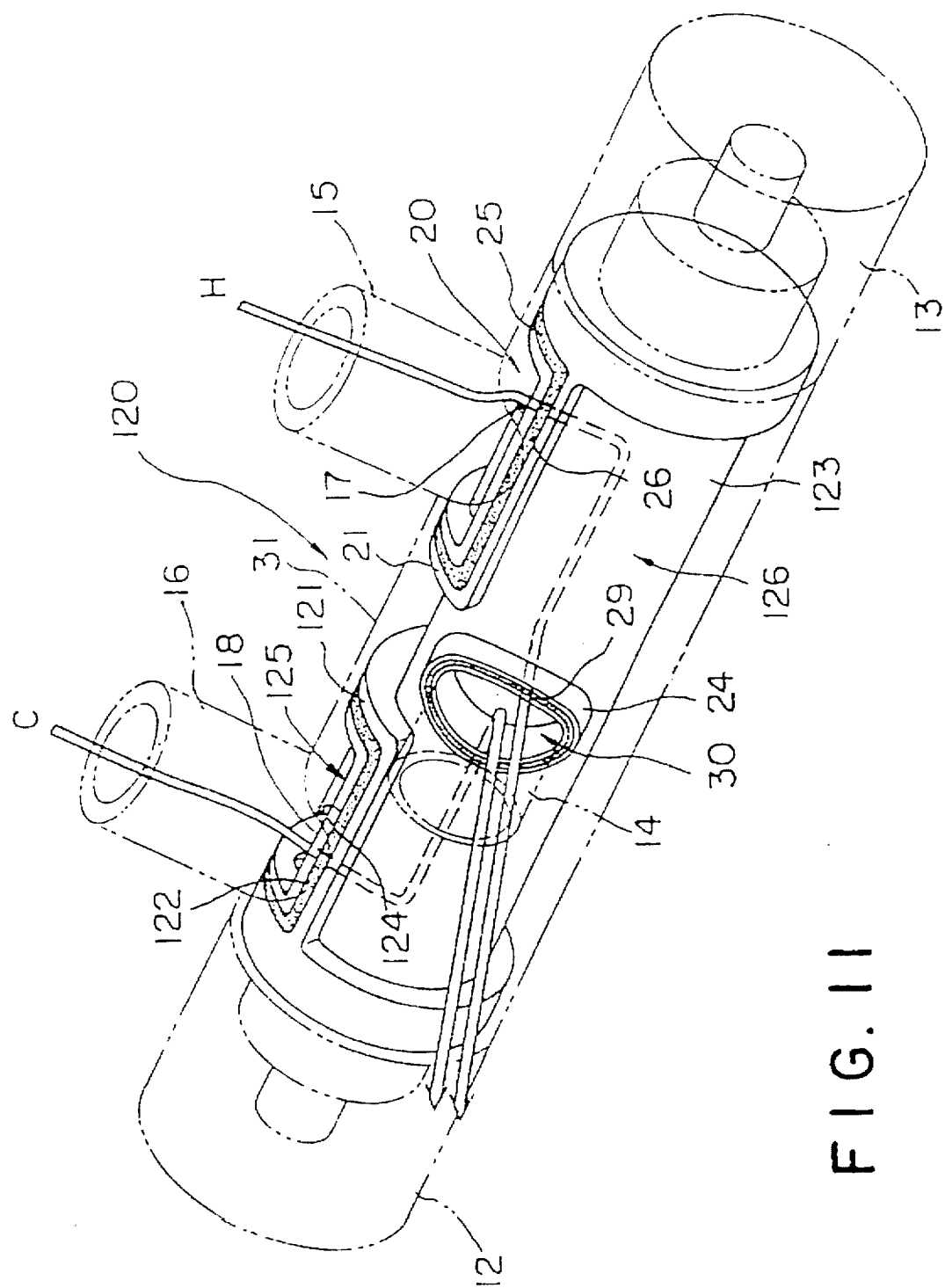
FIG. 11 is an external perspective view showing a fifth embodiment of the invention.

FIG. 11 is an external perspective view showing a fifth embodiment of the present invention. A hot and cold water mixing device 120 according to the present embodiment is characterized, in the first embodiment shown in FIG. 1, by the fact that a seal holding part 121 is provided also on the outer periphery of the cold water inlet hole 18, and a seal member 122 is mounted on the seal-holding part 121 so as to enclose the cold water inlet hole 18. Accordingly, the same component parts as those in FIG. 1 are designated by the same reference characters, and the explanation thereof is omitted.

The seal-holding part 121 is formed by the rectilinear portions extending in the axial and circumferential directions, which enclose the cold water inlet hole 18 provided on the outer surface at one end of an inner housing 123, substantially with a rectangular, and a concave groove 124 for inserting the seal member is continuously formed along the rectilinear portions. The inner housing 123 with the seal member 122 being inserted into the concave groove 124 is inserted into and fixed to the outer housing 31, so that a cold water passage 125 is formed in the inner region enclosed by the seal member 122.

In the present embodiment, the hot water passage 20, cold water passage 125 and mixed water passage 30 are formed in the regions enclosed by the seal member 26, 122 and 29. This makes it different from the first embodiment shown in FIG. 1, and the space 126 formed between the inner housing 123 and the outer housing 31 except the regions of the above-mentioned passages is filled with a substance other than water, for example, air, a heat resistant member or the like.

Since primary water is not supplied into the space 126, seal members for preventing the leakage of water are not needed to be fitted to both ends of the inner housing 123, as shown in FIG. 1.

The present embodiment offers the function and effects which are substantially similar to those of the first embodiment shown in FIG. 1. However, since the cold water passage 125 is formed in the region enclosed by the seal member 122, it is not possible to flow cold water over a wide region in the axial and circumferential directions of the mixing device to thereby perform an insulation from the high temperature part and a regulating action of thermal balance; however, the function equal to the above can be realized by air or a heat resistant member filled in the space 126.

Figure 12:
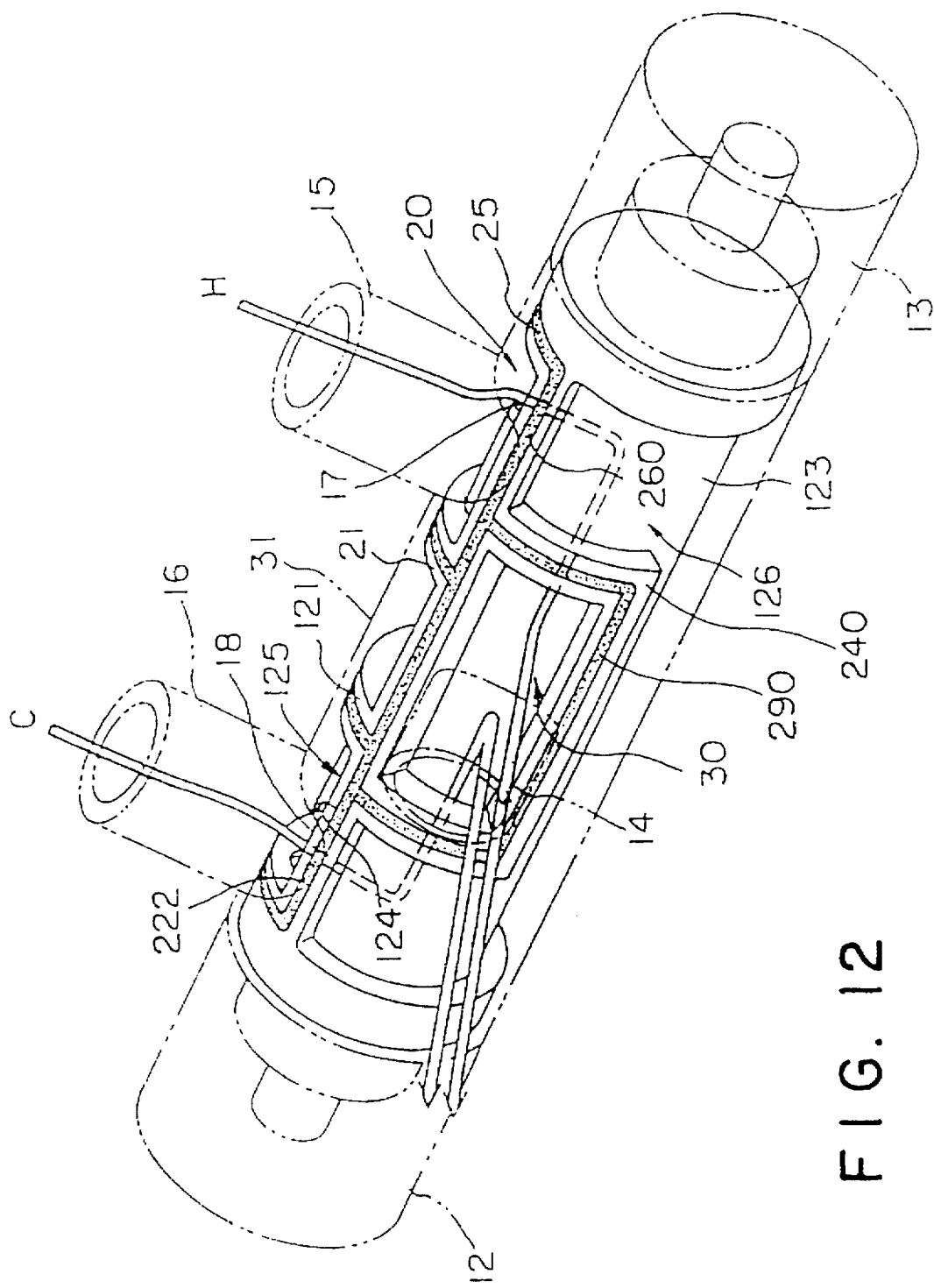
FIG. 12 is an external perspective view showing a modification of the fifth embodiment of the invention.

FIG. 12 is an external perspective view showing a modification of the embodiment shown in FIG. 11. In this modification, a seal member 260 for forming the hot water passage, a seal member 222 for forming the cold water passage and a seal member 290 for forming the mixed water passage 30 communicate with each other and are integrally formed. Further, the seal-holding part 240 forming the mixed water passage 30 is of a rectangle which is elongated in the axial direction, and also a seal member 290 mounted on the seal-holding part 204 is rectangular in form. Thus, forming and inserting the seal members is facilitated and, simultaneously, adjustment in the connecting position of a faucet to the mixed water passage 30 is facilitated.

Figure 13:
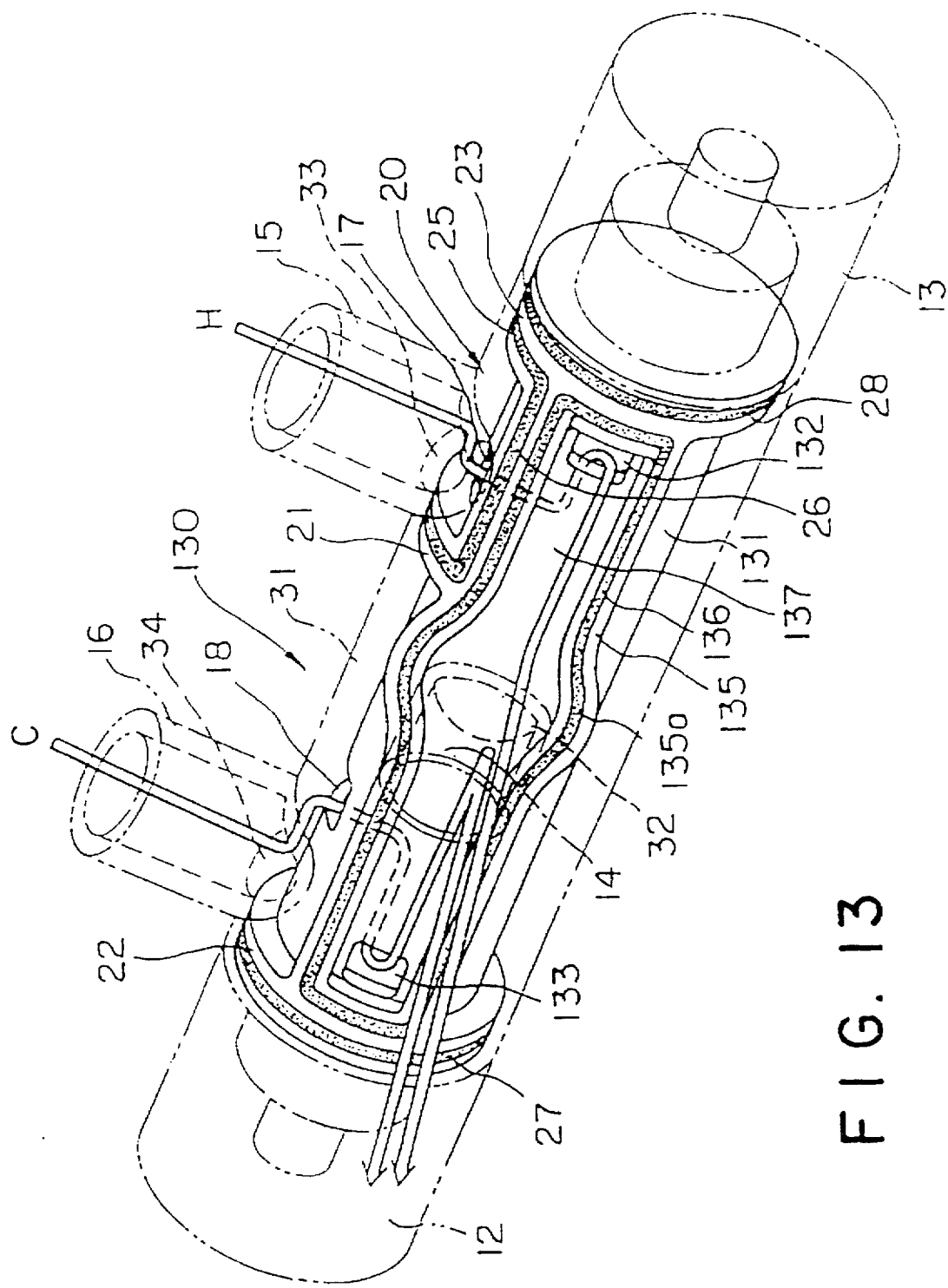
FIG. 13 is an external perspective view showing a sixth embodiment of the invention.

FIG. 13 is an external perspective view showing a sixth embodiment of the present invention. A hot and cold water mixing device 130 according to the present embodiment is different from the afore-mentioned first embodiment in that the inner housing 131 is provided with a hot water delivery hole 132 and a cold water delivery hole 133 instead of the mixed water delivery hole. The component parts common to those of the first embodiment are designated by the same reference characters, and the explanation thereof is omitted.

The hot water delivery hole 132 and the cold water delivery hole 133 are provided at the side of the hot water inlet hole 17 and cold water inlet hole 18, respectively, and communicate with each other by way of an opening and closing valve for hot water (not shown) controlled so as to be closed and opened by means of the hot water handle 13 disposed within the inner housing 131, and by way of a opening and closing valve for cold water (not shown) controlled so as to be closed and opened by means of the cold water handle 12.

Both the hot water delivery hole 132 and the cold water delivery hole 133 are enclosed together by a seal holding part 135 having rectilinear portions extending axially. The seal holding part 135 is formed thereon with a concave groove 135a for inserting a seal member, into which the seal member 136 is continuously inserted.

The inner housing 131 with the seal members 25, 27, 28 and 136 being mounted thereon is inserted into and fixed to the outer housing 31, so that a mixed water passage 137 which is also used as a mixing chamber is formed in a region of the space enclosed by the seal member 136.

Moreover, the mixed water outlet hole 32 provided on the outer housing 31 is arranged at the position where it communicates with the mixed water passage 137.

According to the present embodiment, hot water and cold water delivered from the hot water delivery hole 132 and cold water delivery hole 133, respectively, are mixed within the mixed water passage 137, and are discharged from the mixed water delivery passage 14 passing through the mixed water outlet opening 32. On the other hand, the water which has flowed from the cold water inlet opening 34 fills the cold water passage formed in a region of the space except the hot water passage 20 and the mixed water passage 137 over a wide range in the axial and circumferential directions, thereby allowing the security of the mixing device 130 against the scalding and the thermal balance thereof to be kept better.

According to the present embodiment, since the mixed water passage 137 is formed by a long dimension in the axial direction, the position of the mixed water outlet opening 32 communicating with the mixed water passage 137 can be freely selected over a wide range in the axial direction.

In addition, since the seal member 136 forming the mixed water passage 137 is arranged in a range smaller than half the outer circumference of the inner housing 131, even if a large pressure due to a phenomenon of water hammer is produced within the cold water passage, the inner housing 131 is radially moved in the direction of the mixed water passage 137 to strongly press the seal member 136 against the inner wall surface of the outer housing 31 and, therefore, there is no leakage of cold water within the cold water passage into the mixed water passage 137.

Figure 14:
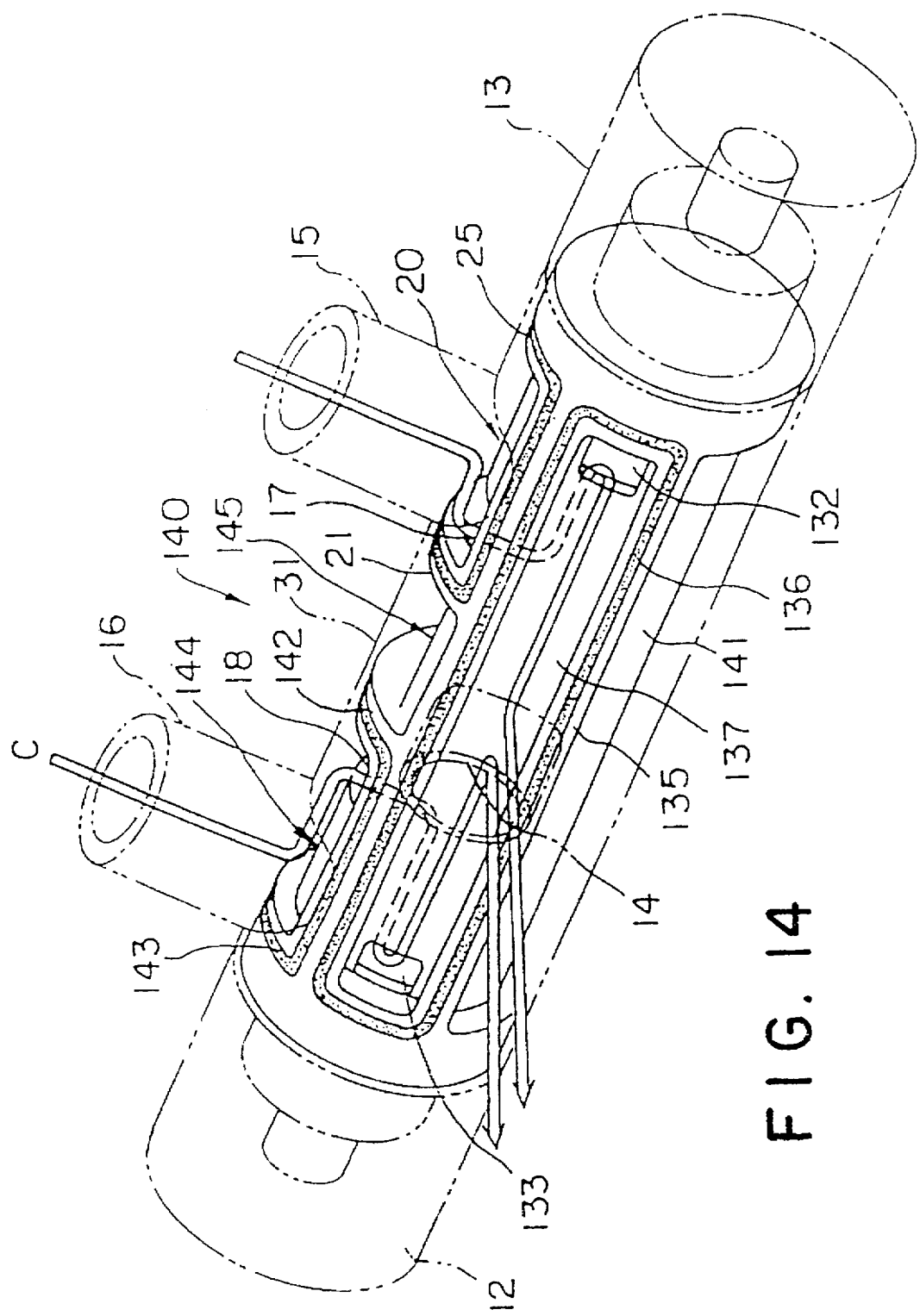
FIG. 14 is an external perspective view showing a seventh embodiment of the invention.

FIG. 14 is an external perspective view showing a seventh embodiment of the present invention. A hot and cold water mixing device 140 according to the present embodiment is a modification of the sixth embodiment shown in FIG. 13, and is characterized by the fact that the outer periphery of the cold water hole 18 of an inner housing 141 is enclosed by a seal holding part 142 and a seal member 143 mounted on the seal holding part 142, in a similar way to the hot water inlet hole 17. The other component parts common to the sixth embodiment are designated by the same reference characters, and the explanation thereof is omitted.

In the present embodiment, a cold water passage 144 is formed in a region of the space enclosed by the seal member 143, and a region 145 of the space except a cold water passage 144, hot water passage 20 and mixed water passage 137 is filled with air or a heat resistant member.

Further, since in the present embodiment the cold water passage 144 is enclosed by the seal member 143, there is no need of mounting the seal members (for example, O-rings) on the inner housing 141 at both the right and left ends thereof, like the sixth embodiment.

FIGS. 15 to 19 are views showing a eighth embodiment of the present invention. In the present embodiment, an inner housing 151 is provided with a first and second mixed water passages 152 and 153 in addition to the hot water inlet hole 17 and the cold water inlet hole 18.

The hot water inlet hole 17 is enclosed by a seal holding part 155 disposed substantially in the form of a square having a concave groove 155a, and the hot water passage 20 is formed within the seal-holding part 155. Moreover, the cold water inlet hole 18 communicates with a cold water passage 154 (refer to FIG. 18), which is defined and formed by the seal holding parts 22 and 23 with the concave grooves 22a and 23a provided at both ends of the inner housing 151, a seal holding part 155 forming the hot water passage 20 and a seal holding part 157 enclosing the first mixed water delivery hole 152.

The second mixed water delivery hole 153 is formed on the same axis as that of the hot water inlet hole 17, and is enclosed by a seal-holding part 161 substantially in the form of a square. On this seal-holding part 161 is formed with a concave groove 161a along the seal-holding part 161.

In the present embodiment, the seal member 157 enclosing the first mixed water delivery hole 152 is extended so that it further encloses the seal-holding part 161 enclosing the second mixed water delivery hole 153, as clearly shown in FIG. 18. Thus, in a region defined by the seal-holding part 157 and the seal holding part 161 is formed a first mixed water passage 159 communicating with the first mixed water delivery hole 152, and in a region enclosed by the seal-holding part 161 is formed a second mixed water passage 163 communicating with the second mixed water delivery hole 153.

On the seal-holding parts 22 and 23 provided at both ends of the inner housing 151 are mounted a circular seal members 27 and 28 for sealing the ends using the respective concave grooves 22a and 23a. Also on concave grooves 155a, 157a and 161a of the afore-mentioned seal members 155, 157 and 161 are similarly mounted seal holding parts 156, 158 and 162 each having rectilinear portions. These seal members constitute the hot water passage, cold water passage and first and second mixed water passages, as the outer housing 171 is fitted onto the inner housing 151, in a similar way to the afore-mentioned embodiment.

In this way, since in the present embodiment the seal-holding part 157 and the seal member 158 enclosing the first mixed water delivery hole 152 are arranged so that they further enclose the seal-holding part 161 and seal member 162 enclosing the second mixed water delivery hole 153, a distance of arrangement between the first and second mixed water delivery holes 152 and 153 can be made small, as compared with the case where the respective seal-holding parts and seal members are arranged independently in a separate relation. This allows the diameter of the inner housing 151 to be made small, whereby the hot and cold water mixing device can be made compact in size.

Figure 19:
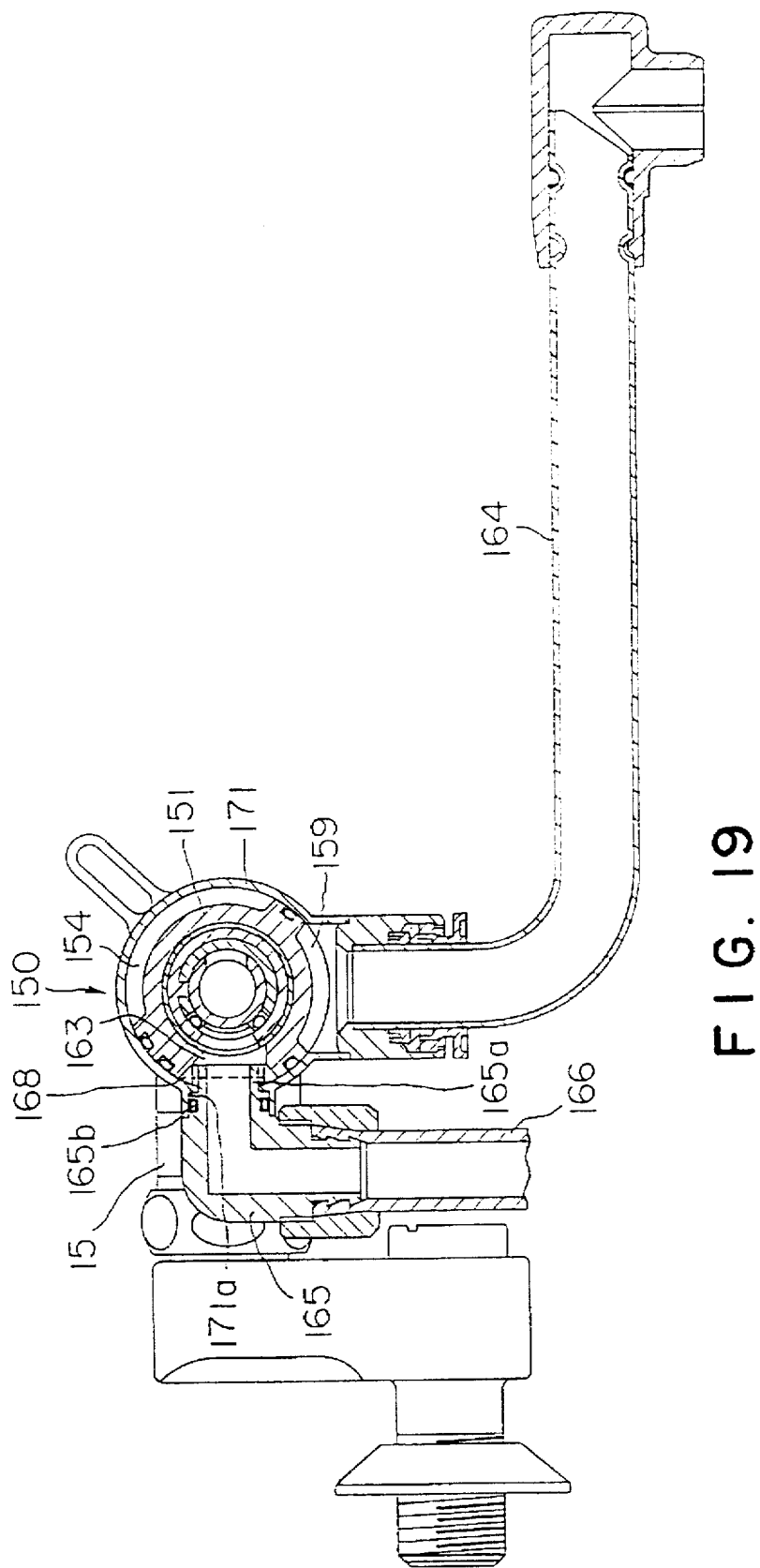
FIG. 19 is a cross-sectional view of a hot and cold water mixing device according to the eighth embodiment of the invention.
Figure 22:
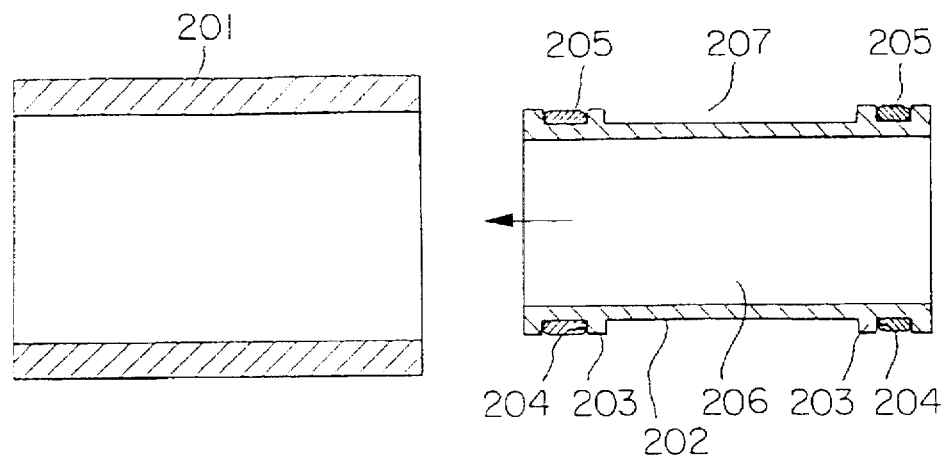
FIGS. 22 to 31 are views showing a method for assembling the hot and cold water mixing device according to the invention, FIG. 22 being an exploded view for explanation.

In the present embodiment, as shown in FIG. 19, the first mixed water passage 159 communicates with a faucet 165, and the second mixed water delivery hole 153 communicates with a shower hose 166 through a shower elbow 165. The shower elbow 165 is a L-shaped hollow tube, and is provided at its forward end with a pair of projections 167 extending radially, as shown in FIG. 20.

The forward end 165a of the shower elbow 165 is inserted into the outer housing 171 and is removably mounted within the second mixed water passage 163. The mounting of the forward end 165a of the shower elbow 165 is performed using a mounting bush 168 shown in FIG. 21.

Namely, the mounting bush 168 is of a square which engages in close contact with the second mixed water passage 163 defined by the seal-holding part 161, and is formed in the center thereof with a through-hole 168a. The through-hole 168a is formed with a circumferential flange 169 projecting inwardly along the inner peripheral edge thereof, and the circumferential flange 169 is formed with a pair of cut-out portions 169a having a form and size which allows the projections 167 of the forward end 165a of the shower elbow 165 to pass through in the axial direction.

Figure 15:
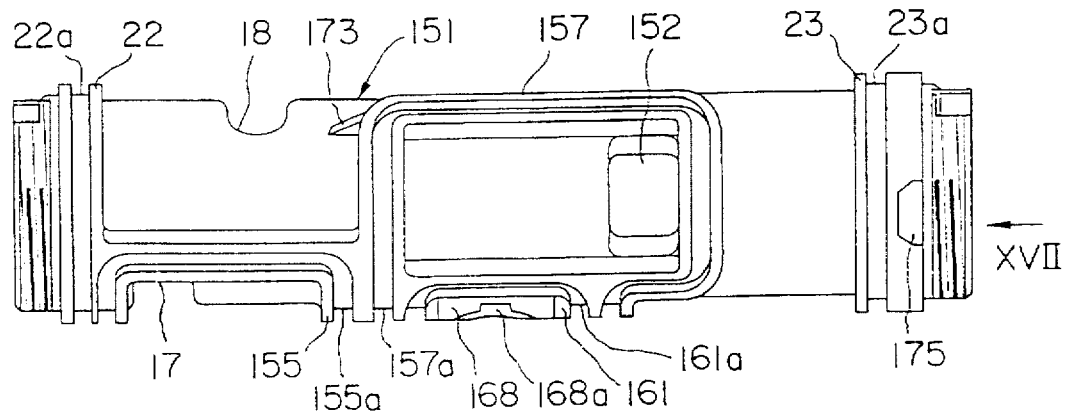
FIG. 15 is a bottom view showing an inner housing according to an eighth embodiment of the invention.
Figure 16:
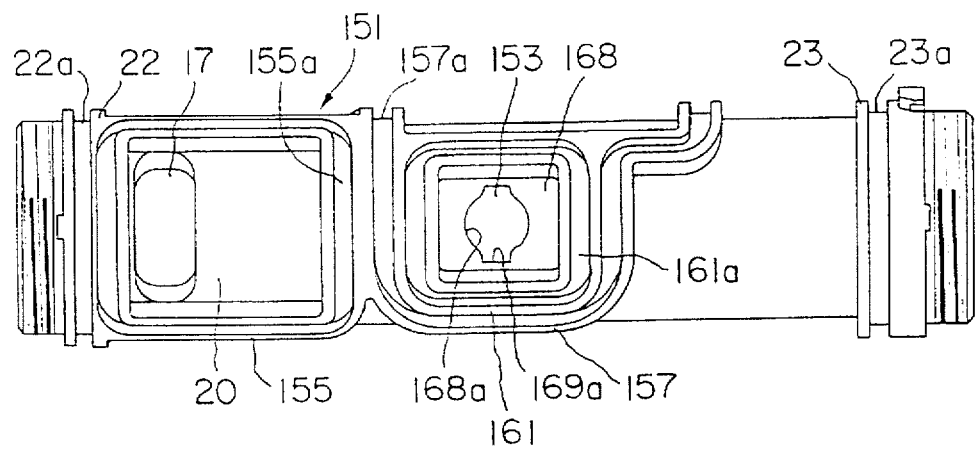
FIG. 16 is a rear view of the inner housing shown in FIG. 15.

As shown in FIGS. 15, 16 and 19, this mounting bush 168 is mounted in close contact with the interior of the second mixed water passage 163, and after the inner housing 151 with this condition is incorporated into the outer housing 171, the forward end portion 165a of the shower elbow 165 is fitted. Namely, the shower elbow 165 is inserted through the second mixed water delivery opening 171a from outside the outer housing 171, the forward end thereof 165a is further inserted into the second mixed water passage 163 by passing the pair of projections 167 through the pair of cut-out portions 169a of the mounting bush 168 and, subsequently, the shower elbow 165 is turned to bring the pair of projections 167 into contact with the circumferential flange 169, thereby preventing the shower elbow from coming off. In this connection, reference character 165b in FIG. 19 designates an O-ring for seal.

In this way, the present embodiment permits the shower elbow 165 for connection of a shower hose to be removably fitted in a simple and easy way. Further, positioning the inner housing 151 and the outer housing 171 axially is performed by fitting the shower elbow 165, which can be used also as a member for preventing the inner housing 151 from coming off. Moreover, if after fitting the shower elbow 165, the shower hose 166 is connected to the other end thereof, the shower hose 166 comes into contact with the hot water supply passage 15 and cold water supply passage (not shown) fitted to the back of the outer housing 171 at the left and right positions with the shower elbow 165 being sandwiched, to thereby limit turning the shower elbow 165, so that the shower elbow 165 can be prevented from coming off the mounting bush 168.

The present embodiment shows an example in which the mounting bush 168 is constituted by a member which is separate from the inner housing 151 for easy machining; however, the circumferential flange 169 having the cut-out portion 169a provided on the mounting bush 168 may be integrally formed within the second mixed water passage 163 of the inner housing 151.

Further, in the present embodiment, ribs 173 having inclined portions are connected to the lateral surfaces of the seal holding parts 157 and 23 parallel to the axial direction, as shown in FIGS. 15 and 18. These ribs 173 serve to facilitate an operation of inserting the inner housing 151 into the outer housing 171 after the seal members 27, 28, 156, 158 and 162 are mounted thereon.

Namely, in the present embodiment, the seal members 156, 158 and 162 are arranged so as to enclose the hot water passage 20 and the first and second mixed water passages 159 and 163, and are not arranged at positions where they are symmetric with respect to the axis on the outer surface of the inner housing 151. Accordingly, as the inner housing 151 is inserted into the outer housing 171, the inner housing 151 comes to enter the outer housing 171 with the position of being inclined with respect to the outer housing 171 due to the elastic forces of the seal members 156, 158 and 162. This often causes the end of the seal-holding part 157 to come into contact with the inner wall surface of the outer housing 171, thus making the incorporation of the inner housing 151 difficult.

Since in the present embodiment the inclined ribs 173 are connected, parallel to the axial direction, to the vicinity of the position of the seal-holding part 157 and to the lateral side of the seal holding part 23, where there are a possibility of coming into contact with the inner wall surface of the outer housing 171, even if the inner housing 151 enters the outer housing 171 with the position being inclined relative to the outer housing 171, the inner housing 151 can be smoothly moved along the inclined portions of the ribs 173 and be easily incorporated into the outer housing 171 without damage to the seal members 27, 28, 156, 158 and 162.

Figure 17:
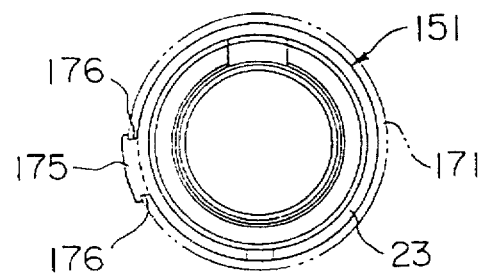
FIG. 17 is a side view of the inner housing as viewed in the direction of arrow mark XVII in FIG. 15.

In the present embodiment, a projection 175 for preventing the inner housing 151 from being turned is provided on the outer circumferential surface at one end of the inner housing 151. At the end of the outer housing 171 is formed a cut-out portion (not shown) having a form and size which engages the projection 175. In addition, this projection 175 has a height to such a degree as to protrude outwardly from the outer peripheral surface of the outer housing 171, as shown in FIG. 17, and is formed at both lateral surfaces thereof with grooves 176 in which the cut-out portion of the outer housing 171 can be inserted.

This construction allows the cut-out portion of the outer housing 171 to securely engage the projection 175 and, simultaneously, allows the deformation of the cut-out portion to be prevented.

FIGS. 22 to 31 are views showing a method for assembling the hot and cold water mixing device according to the present invention.

Referring to the views, reference character 201 indicates a cylindrical outer housing, and reference character 202 a cylindrical inner housing to be inserted into the outer housing 201. At both axial ends and the outer periphery of the inner housing 202 are provided partition walls (seal holding parts) 203 in the form of outer flanges and rectilinear seal holding parts (not shown), respectively, and on the outer circumferential surface of these partition walls 203 are provided seal mounting parts 204 in the form of ring grooves. After seal members 205 such as O-rings, U-packings, X-packings and the like are mounted on the respective seal-mounting parts 204, they are compressed and deformed so that the outer surfaces thereof become flush with the outer circumferential surfaces of the partition walls 203, and are frozen with the compressed and deformed condition.

The inner housing 202 with the seal members 205 being frozen is inserted into the outer housing 201 for assembly and, thereafter, the seal members 205 are thawed.

Insertion of the inner housing 202 into the outer housing 201 forms a water passage 206 in the interior of the inner housing 202 and, simultaneously, a water passage 207 defined by the two partition walls 203 at both ends between the outer housing 201 and the inner housing 202.

An embodied example of the method for assembling the hot and cold water mixing device according to the present embodiment will be explained with reference to FIGS. 23 to 31.

Figure 23:
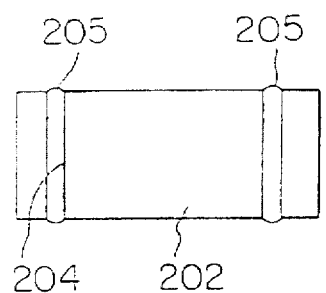
Figures 24, 25:
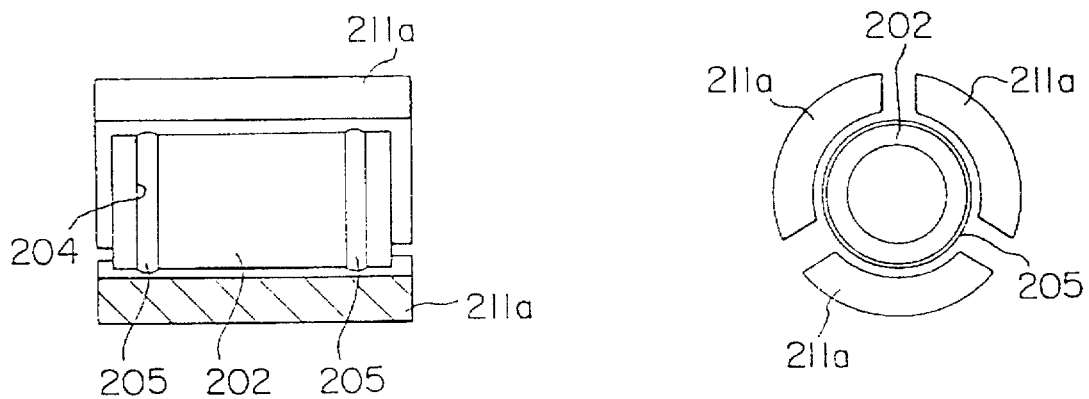

First, as shown in FIG. 23, the seal members 205 are mounted onto the seal-mounting parts 204 of the inner housing 202 and, subsequently, as shown in FIGS. 24 and 25, the seal members 205 are compressed and deformed by means of a fastening jig 211.

Figure 26:
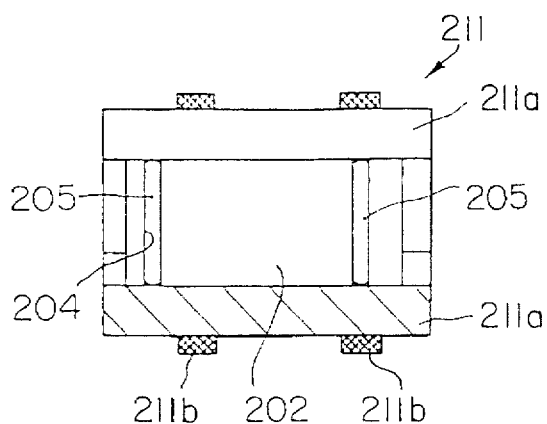
Figure 27:
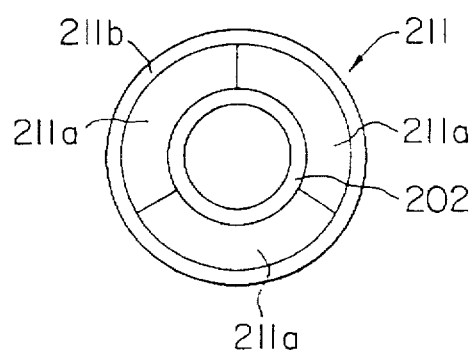

This fastening jig 211 comprises divided type jig bodies 211a, which are circumferentially divided into three pieces and which are of a tube-like shape as a whole, and fastening members 211b for fastening the jig bodies 211a. The seal members 205 are compressed and deformed by fastening the fastening jig 211 until the outer surfaces thereof come to be flush with the outer surfaces of the seal mounting parts 204, as shown in FIGS. 26 and 27.

Figure 28:
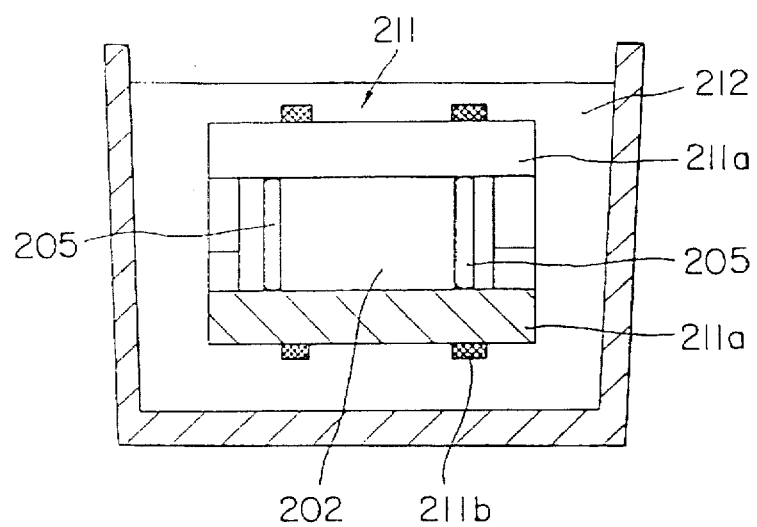

Subsequently, as shown in FIG. 28, the inner housing 202 with the fastening jig 211 being fitted thereto, i.e., with the seal members 205 being compressed and deformed, is immersed into liquid nitrogen 212 and is frozen with the seal members 205 being compressed and deformed.

Figure 29:
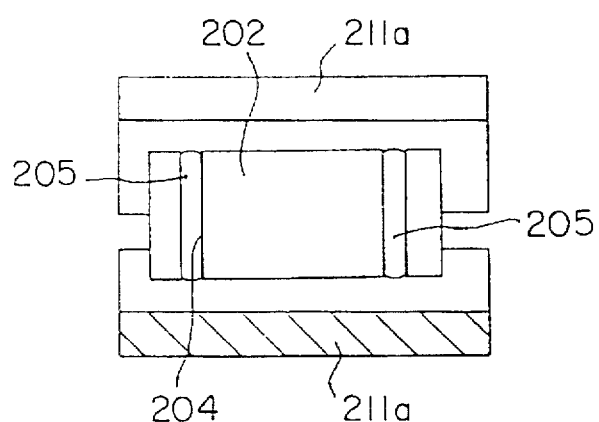
Figure 30:
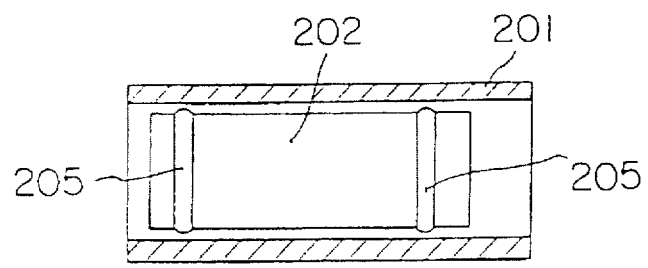

Subsequently, as shown in FIG. 29, the inner housing 202 is pulled up from the liquid nitrogen 212, and the fastening jig 211 is removed. As shown in FIG. 30, the inner housing 202 with the seal members 205 being frozen thereon is then inserted into the outer housing 201.

Figure 31:
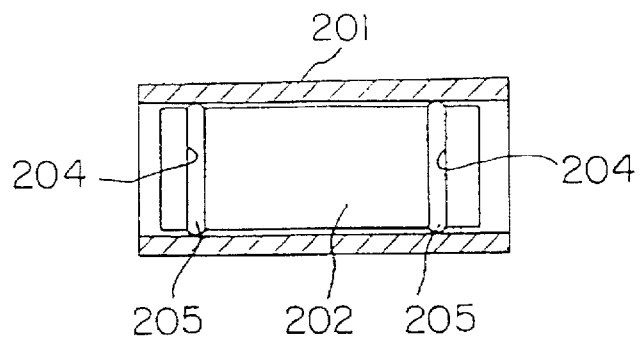

Subsequently, as shown in FIG. 31, the frozen seal members 205 are thawed to thereby restore the seal members 205 to the original forms.

Therefore, in inserting the inner housing 202 into the outer housing 201, the seal members 205 scarcely come into contact with the outer housing 201 and are considerably small in its frictional resistances; so, an inserting and assembling operation is easily performed and damage to the seal members 205 can be prevented. Further, there is no defect of the seal members 205 coming off the seal mounting parts 204 due to their frictional resistances during the assembling operation.

Figure 32:
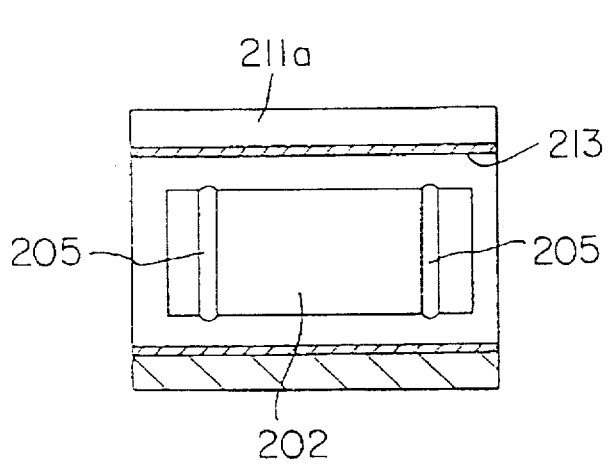
FIG. 32 is a sectional view showing an example of another method for assembling the hot and cold water mixing device according to the invention.
Figure 33:
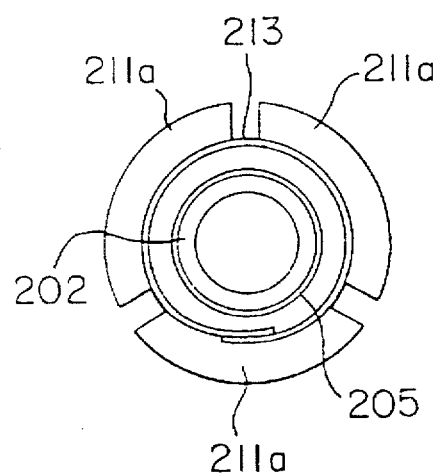
FIG. 33 is a side view of the example shown in FIG. 32.

FIGS. 32 and 33 show an example of another assembling method in which a coil-like sheet metal 213 is interposed between jig bodies 211a and the seal members 205.

Figure 34:
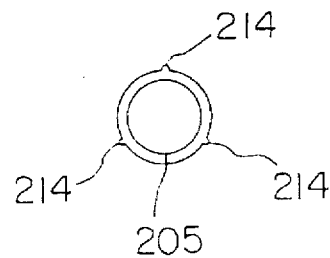
FIG. 34 is an explanative view showing the situation of projections produced on the seal member.

Namely, in the case where the seal members 205 are directly fastened with the jig bodies 211a, projections 214 are often produced on the seal members 25 at the divided positions of the jig bodies 211a, as shown in FIG. 34.

However, in the case where the sheet metal 213 is interposed between the jig bodies 211a and the seal members 205, radial movement of the jig bodies 211a causes the sheet metal 213 to increase or decrease in diameter, thereby enabling the above-mentioned protrusions 214 to be prevented from being produced.

Figure 35:
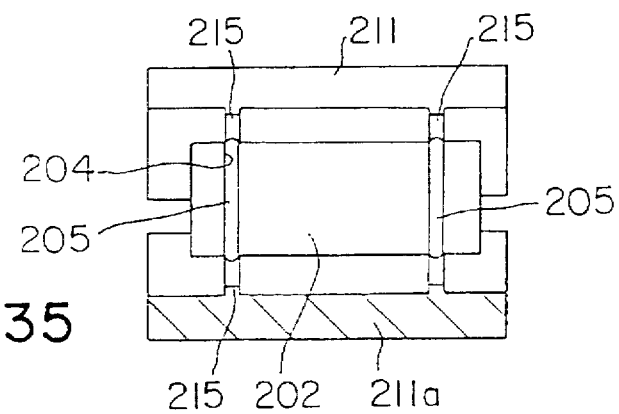
FIG. 35 is a sectional view showing an example of other method for assembling the hot and cold water mixing device according to the invention.
Figure 36:
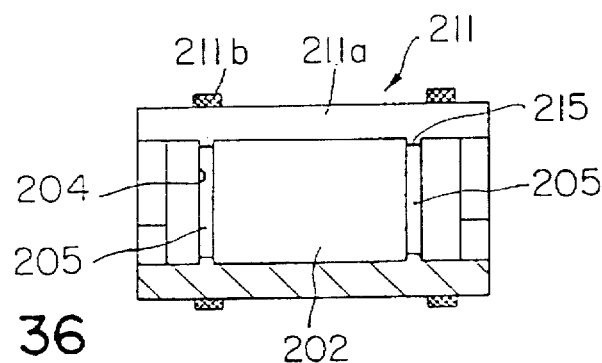
FIG. 36 is a sectional view showing the situation of the jig bodies shown in FIG. 35 being fastened with fasteners.

FIGS. 35 and 36 further show an example of other assembling method, in which the jig bodies 211a are provided on the inner circumferential surface thereof with projecting stripes 215 corresponding to the seal members 205, so that when the seal members 205 are compressed and deformed, the outer surfaces of the seal members 205 come to the height lower than the height of the outer surfaces of the seal mounting parts 204.

With this method, the seal members can be completely prevented from coming into contact with the outer housing 201 when the inner housing 202 is inserted into the outer housing 201.

Figure 37:
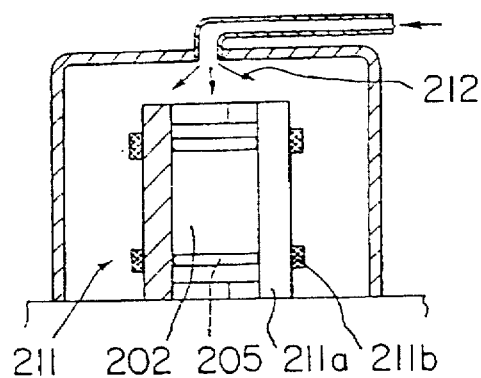
FIG. 37 is a sectional view showing an example of other method for assembling the hot and cold water mixing device according to the invention.
Figure 42:
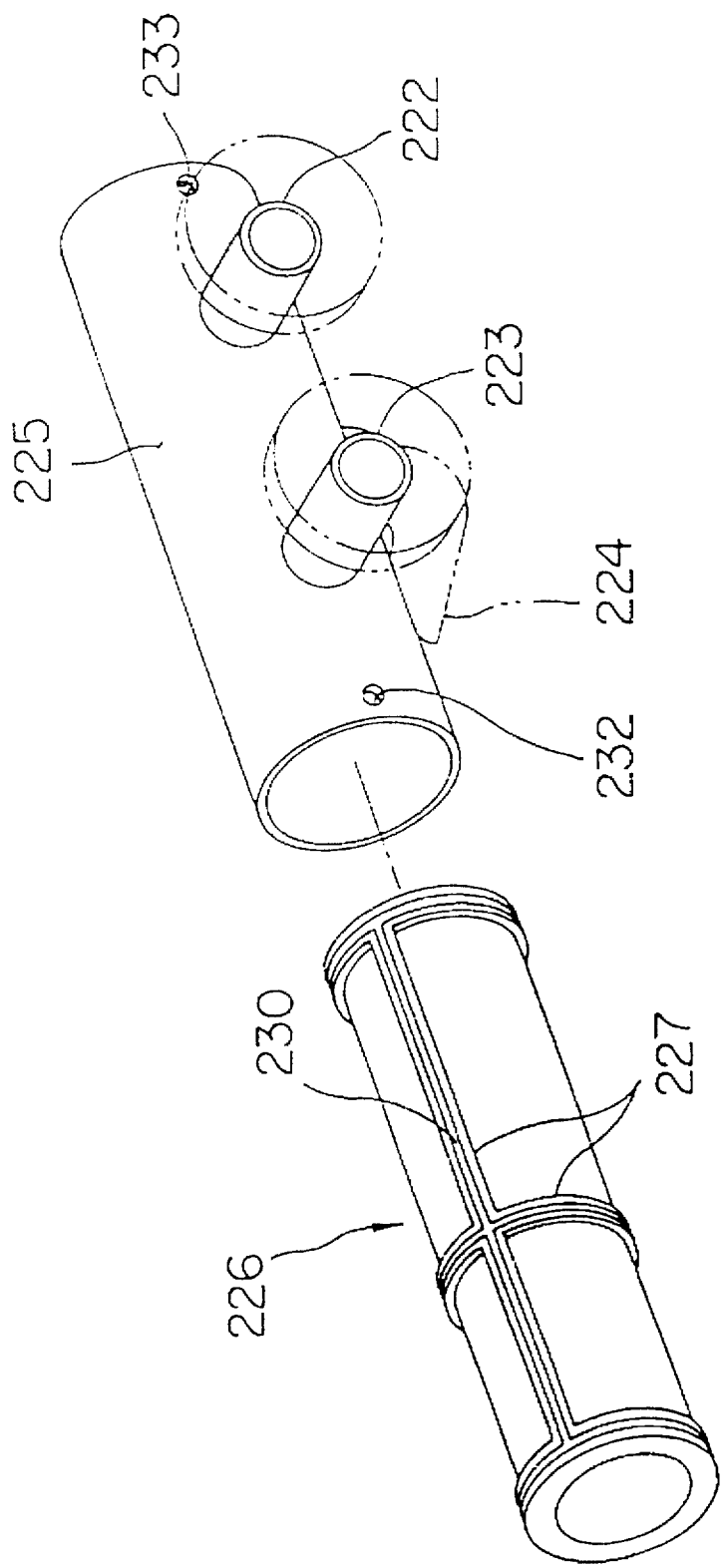
FIGS. 42 to 46 are views showing a method different from the above-mentioned method for assembling the hot and cold water mixing device according to the invention, FIG. 42 being an exploded perspective view for explanation.

FIG. 37 shows an example of other assembling method, in which as the seal members 205 are frozen, the inner housing 202 is not immersed within the liquid nitrogen 212, but the liquid nitrogen 212 is sprayed onto the inner housing 202.

Also with this method, the seal members 205 can be frozen, in a similar way to the case of immersion, providing similar effects.

FIG. 38 shows an example of further assembling method, in which as the seal members are frozen, the inner housing 202 is not immersed into the liquid nitrogen 212, but the liquid nitrogen 212 is passed through passages 216 provided in the jig bodies 211a.

Also with this method, the seal members 205 can be frozen, in a similar way to the case of immersion, providing similar effects.

In the afore-mentioned each embodiment, the case where the outer surfaces of the seal members 205 are compressed and deformed flush with or smaller than the height of the seal mounting parts 204 is explained; however, there is particularly no limitation in a degree of compression and deformation thereof.

Further, although is not particularly explained in the afore-mentioned each embodiment, the fastening jig 211 which has been removed from the inner housing 202 after the seal members 205 are frozen, is cooled to a considerably low temperature and, therefore, moisture in the air is often frozen and sticks to the surface of the fastening jig 211 as frost. For this reason, when the seal members 205 are mounted on a new inner housing and are compressed and deformed, it is preferable to thaw and dry the fastening jig 211. Alternatively, it is preferable that any frost is prevented from sticking to the fastening jig 211 by cooling the entire room to below the freezing point to make the air therein dry or by using an air curtain system utilizing dried air.

FIGS. 39 to 41 are explanative views showing other assembling method using liquid nitrogen. In this embodiment, a sheet metal member 241 made of stainless steel is used as a fastening jig for compressing and deforming the seal members 205 mounted on the outer circumferential portion of the inner housing 202.

Namely, as shown in FIG. 39, the sheet metal member 241 is secured at one end to a plate-like grasping part 242 and the other end thereof is wound so that a hollow cylindrical part 243, in which the inner housing 202 can be inserted, is formed.

Subsequently, the inner housing 202 with the seal members 205 being mounted thereon is inserted into the hollow cylindrical part 243, and the plate-like grasping part 242 is pulled, thereby causing the hollow cylindrical part 243 at the other end of the sheet metal member 241 to be reduced in diameter (FIG. 40). Thus, the outer diameter of the seal member 205 is compressed to a dimension substantially equal to the outer diameter of the inner housing 202.

With this condition, the seal members 205 are immersed into the liquid nitrogen 212 together with the sheet metal member 241 and are frozen (FIG. 41). This method allows the seal members 205 to be compressed and frozen by means of a simple device and, simultaneously, allows the amount of use of the liquid nitrogen 212 to be reduced.

FIGS. 42 to 46 are views showing an example of other assembling method of the hot and cold water mixing device according to the present invention.

As shown in the views, in the present embodiment, each one of injection ports 232, 233 communicating with a continuous concave groove 230 on seal-holding parts 227 is drilled through the pipe wall near both ends of the outer housing 225. These injection ports 232 and 233 are drilled on the same line as the connecting positions of a hot water supply tube 222 and a cold water supply tube 223, i.e., at the parts which come to the back surface when the hot and cold water mixing device is attached. Further, the inner housing 226 is provided on the outer surface thereof with the seal-holding parts 227 having the continuous groove 230; however, no packing is incorporated into the concave groove 230 at the time of assembly.

Figure 43:
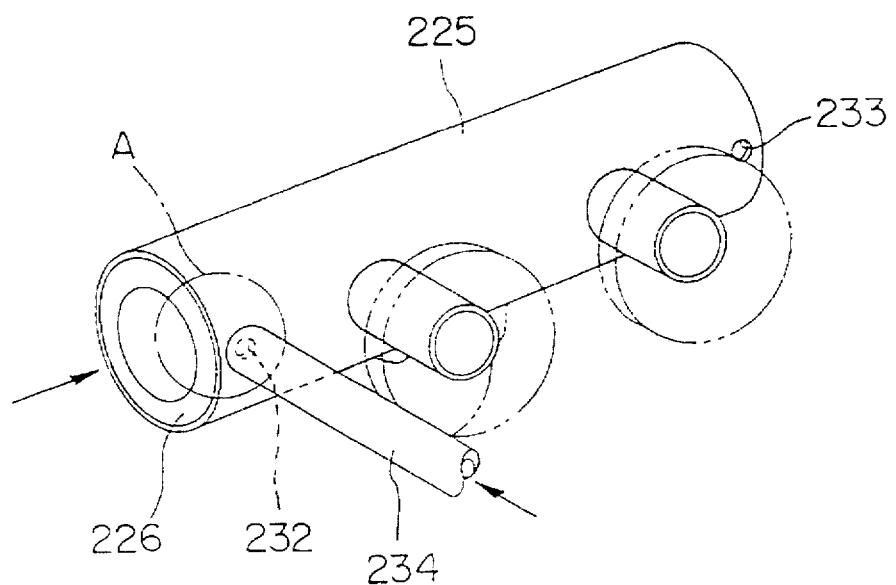
Figure 44:
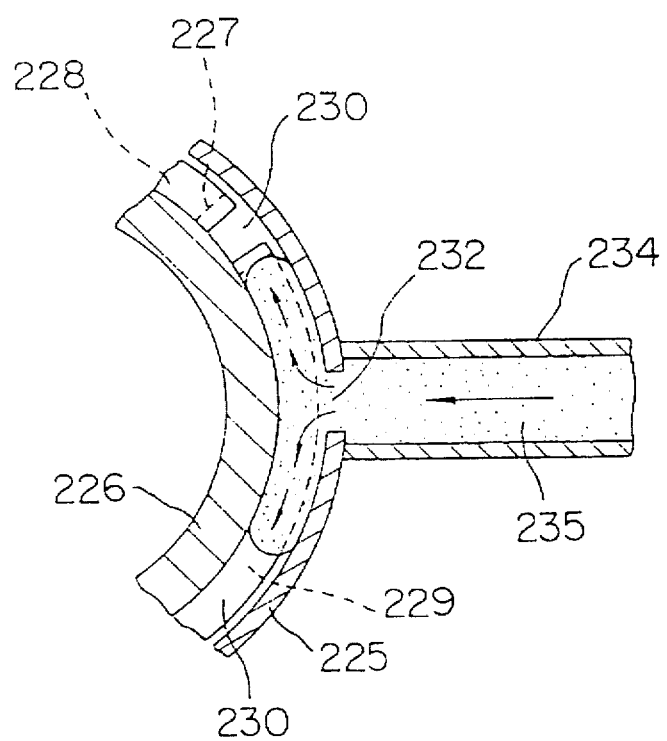
Figure 45:
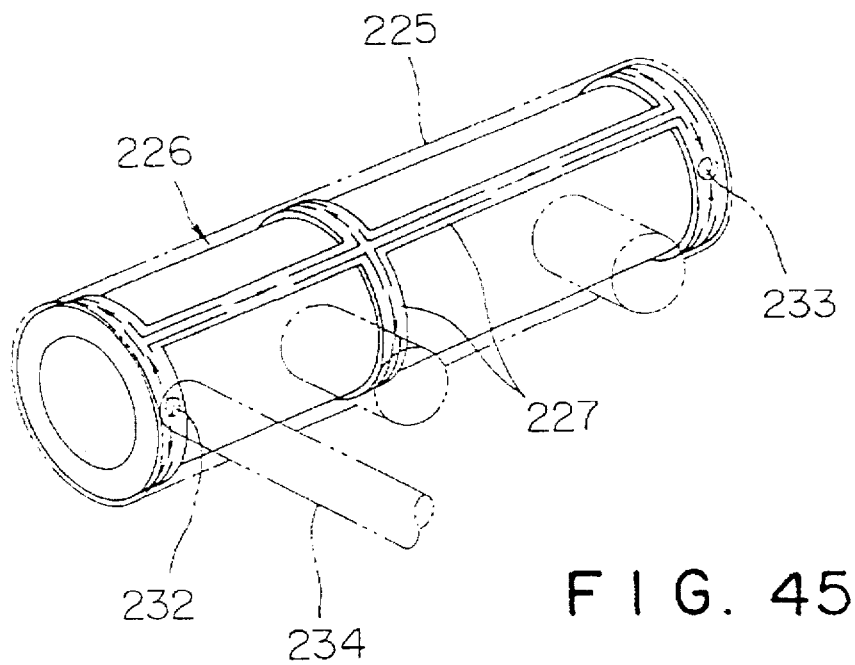

In an assembling operation, an operator or an assembling device first inserts and fits the inner housing 226 into the outer housing 225 and performs its positioning, as shown in FIG. 43. At this time, since the seal members are not mounted, the operation is performed in a considerably easy way. Subsequently, as shown in FIG. 44 (an enlarged sectional view of "A" section in FIG. 43), a nozzle 234 of a device for injecting a liquid seal material is pressed against one 232 of the injection ports of the outer housing 225, and a heat-setting type liquid seal material 235 (for example, liquid rubber, adhesive or the like) is injected therein. After the injected liquid seal material 235 prevails in the whole, as shown in FIG. 45, and reaches the other injection port 233, since the concave groove 230 of the seal-holding parts 227 is continuous.

Figure 46:
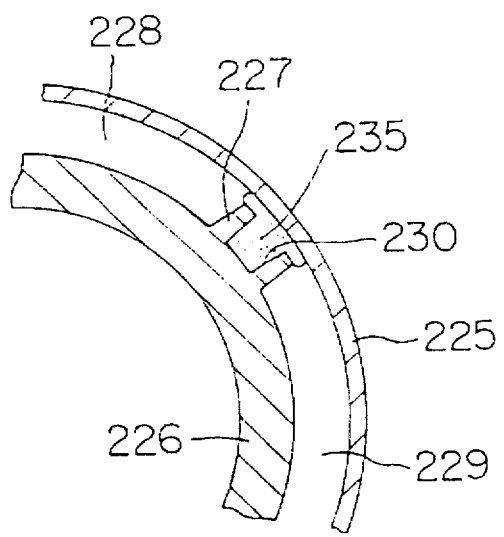

After the liquid seal material 235 leaks out from the injected port 233, the hot and cold water mixing device is brought into a constant temperature oven or the like and heated for a predetermined period of time. This causes the liquid seal material 235 to set like a rubber, so that the cold water passages 228 and 229 are securely sealed. Moreover, since the liquid seal material 235 enters into a clearance between the inner surface of the outer housing 225 and the seal-holding parts 227, as shown in FIG. 46, sealing is performed with a greater width compared with the conventional solid packing. Accordingly, reliable sealing is possible without leakage of hot water or cold water due to the water pressure. As a liquid seal material 235, silicone, which is difficult for hydrolysis to occur when it comes into contact with hot water, is preferable.

Industrial Applicability

As explained above, according to the present invention, since at least a water hole, which communicates with a hot water supply passage among two primary water passages, and a secondary water hole are enclosed by means of insulating members which each are partly arranged in the direction of intersection with the circumferential line of the inner housing, so that required fluid passages are formed within a vacant space between the inner housing and the outer housing, hot water is insulated within a predetermined, for example, narrow region, thereby preventing the inner housing from reaching a too high temperature, and a heat insulating material such as water, air or the like can be arranged over a wide range so as to enclose the outer periphery of the inner housing and, simultaneously, such a construction can be simply provided without forming any particular passage within the inner housing.

According to the present invention, since a secondary water hole communicating with a mixed water delivery passage is enclosed by means of insulating members which each are partly arranged in the direction of intersection with the circumferential line of the inner housing, the enclosed region of the secondary water hole can be formed greatly in the axial direction of the inner housing. Accordingly, the positions of arrangement of a faucet, a hose for shower and the like connected to the enclosed region can be selected with a degree of freedom which is great in the axial direction.

Further, according to the present invention, since the regions enclosed by the insulating members can be largely formed in the axial direction of the inner housing, adjustment in the offsets of the openings provided on both the inner housing and the outer housing can be performed in a relatively easy manner.

In addition, according to the present invention, changing the place and form of arrangement of the insulating member, the number and form of the water holes, and the like allows an optimum hot and cold water mixing device to be simply constituted according to the application of use and the situation of use.

We claim:

1. A hot and cold water mixing device which comprises:
   an outer housing having openings which communicate with a hot water supply passage, a cold water supply passage and a mixed water delivery passage;
   a hollow inner housing which is inserted into the outer housing with a vacant space remaining therebetween and on which two primary water holes communicating with said hot water supply passage and said cold water supply passage, respectively, and a secondary water hole communicating with said mixed water delivery passage are formed passing through the wall of said hollow inner housing from the outer surface thereof; and insulating members for forming fluid passages within said vacant space between said outer housing and said inner housing, which enclose at least one water hole communicating with said hot water supply passage among said two primary water holes, and said secondary water hole, respectively, and which each are partly arranged in the direction of intersection with the circumferential line of the inner housing.

2. A hot and cold water mixing device as claimed in claim 1, wherein said water holes each are enclosed by the insulating member which is non-circular in form.

3. A hot and cold water mixing device as claimed in claim 2, wherein said insulating members are of the forms different in the dimensions at the right and left direction and in the up and down direction intersecting perpendicularly to each other.

4. A hot and cold water mixing device as claimed in claim 2, wherein said insulating members each include at least partly a rectilinear portion.

5. A hot and cold water mixing device as claimed in claim 4, wherein said rectilinear portion extends substantially parallel to the axial direction of the inner housing.

6. A hot and cold water mixing device as claimed in claim 1, wherein said water holes each are formed in a noncircular shape passing through the wall.

7. A hot and cold water mixing device as claimed in claim 6, wherein said water holes each are of the form different in the dimensions of opening at the right and left direction and in the up and down direction intersecting perpendicularly to each other.

8. A hot and cold water mixing device as claimed in claim 6, wherein said water holes each include at least partly a rectilinear portion.

9. A hot and cold water mixing device as claimed in claim 1, wherein said insulating members consist of seal members having elasticity.

10. A hot and cold water mixing device as claimed in claim 9, wherein said respective insulating members are arranged so that one of the insulating members is disposed at a position displaced from a position, where it is facing with the other insulating member, in a section intersecting perpendicularly to the axis of the inner housing.

11. A hot and cold water mixing device as claimed in claim 1, wherein said insulating members are mounted on the outer surface of the inner housing.

12. A hot and cold water mixing device as claimed in claim 1, wherein means for controlling the fluid which flows into and out of the inner housing through the respective water holes thereof is provided within the inner housing.

13. A hot and cold water mixing device as claimed in claim 12, wherein said controlling means is of a cartridge type construction.

14. A hot and cold water mixing device as claimed in claim 12, wherein the outer housing is provided with an insertion opening for inserting and disposing the inner housing from the outside.

15. A hot and cold water mixing device as claimed in claim 14, wherein the insertion opening of the outer housing is used also as a communicating hole of an operating part for operating a fluid controlling means.

16. A hot and cold water mixing device as claimed in claim 1, wherein the outer housing is made of a pipe material.

17. A hot and cold water mixing device as claimed in claim 1, wherein the outer housing consists of a tubular member formed by forging.

18. A hot and cold water mixing device as claimed in claim 1, wherein the inner housing is provided, as water holes, with a hot water inlet hole, a cold water inlet hole and a mixed water delivery hole.

19. A hot and cold water mixing device as claimed in claim 18, wherein said insulating members each comprise a hot water insulating member arranged so as to enclose the hot water inlet hole so that it forms a hot water passage, and a mixed water insulating member arranged so as to enclose the mixed water delivery hole so that it forms a mixed water passage.

20. A hot and cold water mixing device as claimed in claim 18, wherein said insulating members each comprises a hot water insulating member arranged so as to enclose the hot water inlet hole so that it forms a hot water passage, a cold water insulating member arranged so as to enclose the cold water inlet hole so that it forms a cold water passage, and a mixed water insulating member arranged so as to enclose the mixed water delivery hole so that it forms a mixed water passage.

21. A hot and cold water mixing device as claimed in claim 18, wherein the mixed water delivery hole comprises first and second mixed water delivery holes which are provided independently from each other.

22. A hot and cold water mixing device as claimed in claim 21, wherein said hot water inlet hole and said first and second mixed water delivery holes each are enclosed by the insulating member.

23. A hot and cold water mixing device as claimed in claim 22, wherein the respective insulating members enclosing the first and second mixed water delivery holes are arranged so that one of the insulating members encloses the other insulating member.

24. A hot and cold water mixing device as claimed in claim 21, wherein the second mixed water passage communicating with the second mixed water delivery hole is connected to a shower hose through a shower elbow inserted into the outer housing so as to pass through the wall thereof, the forward end of said shower elbow being removably mounted on said second mixed water passage.

25. A hot and cold water mixing device as claimed in claim 24, wherein the shower elbow is provided at the forward end thereof with a radially extending projection, and the second mixed water passage is provided at the circumferential edge thereof with a circumferential flange with which said projection of the shower elbow comes into a slidable engagement and which is formed with a cut-out portion which allows said projection to pass through in the axial direction.

26. A hot and cold water mixing device as claimed in claim 24, wherein the shower elbow is provided at the forward end thereof with a radially extending projection, and the second mixed water passage is provided with a bushing having a circumferential flange with which the projection of said shower elbow comes into a slidable engagement and which is formed with a cut-out portion which allows said projection to pass through in the axial direction.

27. A hot and cold water mixing device as claimed in claim 24, wherein the second mixed water passage is provided between the hot water inlet hole and the cold water inlet hole.

28. A hot and cold water mixing device as claimed in claim 1, wherein the inner housing is provided with the hot water inlet hole, cold water inlet hole, hot water delivery hole and cold water delivery hole.

29. A hot and cold water mixing device as claimed in claim 28, wherein the insulating members comprise a hot water insulating member arranged so as to enclose the hot water inlet hole so that it forms a hot water passage, and a mixed water insulating member arranged so as to enclose the hot and cold water delivery holes together so that it forms a mixed water passage.

30. A hot and cold water mixing device as claimed in claim 28, wherein the insulating members comprise a hot water insulating member arranged so as to enclose the hot water inlet hole so that it forms a hot water passage, a cold water insulating member arranged so as to enclose the cold water inlet hole so that it forms a cold water passage, and a mixed water insulating member arranged so as to enclose the hot water delivery hole and the cold water delivery hole together so that it forms a mixed water passage.

31. A hot and cold water mixing device as claimed in claim 19, wherein the mixed water insulating member is formed at least integrally with the hot water insulating member.

32. A hot and cold water mixing device as claimed in claim 19, wherein sealing members for sealing the vacant space between the inner housing and the outer housing are mounted on both ends of the inner housing.

33. A hot and cold water mixing device as claimed in claim 32, wherein the sealing members are formed integrally with at least one of the hot water insulating member and the mixed water insulating member.

34. A hot and cold water mixing device as claimed in claim 32, wherein the sealing members are integrally formed with the outer surface of the inner housing.

35. A hot and cold water mixing device as claimed in claim 19, wherein the mixed water insulating member is arranged within a range smaller than half the outer circumference of the inner housing.

36. A hot and cold water mixing device as claimed in claim 1, wherein the inner housing is formed of a synthetic resin material.

37. A hot and cold water mixing device as claimed in claim 11, wherein the inner housing is integrally formed, on the outer surface thereof, with holding parts having concave grooves for mounting the insulating members.

38. A hot and cold water mixing device as claimed in claim 37, wherein the holding parts for mounting the insulating members are provided so as to protrude from the outer surface of the inner housing, and one or more ribs each having an inclined portion are connected to the lateral surfaces of the holding parts parallel to the axial direction.

39. A hot and cold water mixing device as claimed in claim 13, wherein the inner housing is formed therein with a control means-accommodating part.

40. A method for forming fluid passages of the hot and cold water mixing device, which comprises the steps of forming a hollow inner housing with two primary water holes communicating with a hot water supply passage and a cold water supply passage, respectively, and a secondary water hole communicating with a mixed water delivery passage, by passing through the wall from the outer surface side;

enclosing the water hole communicating least with the hot water supply passage among said two primary water holes and the secondary water hole, using insulating members which each are partly arranged in the direction of intersection with the circumferential line of the inner housing; and inserting said inner housing into the hollow outer housing having the openings communicating with the hot water supply passage, cold water supply passage and mixed water delivery passage, respectively, thereby forming fluid passages within the vacant space between the inner housing and the outer housing.

41. A method for forming fluid passages as claimed in claim 40, characterized int that the water holes are enclosed in the form of non-circles by the insulating members to form fluid passages.

42. A method for forming fluid passages as claimed in claim 40, characterized in that the water holes are enclosed by the insulating members having rectilinear portions extending substantially parallel to the axis of the inner housing, to thereby form fluid passages.

43. A method for assembling the hot and cold water mixing device by mounting the seal members on the seal-mounting parts of the inner housing and, thereafter, inserting the inner housing into the outer housing, characterized in that the seal members mounted on the seal-mounting parts are compressed and deformed so that their outer surfaces come to be flush with or smaller than the inner circumferential surface of the outer housing, and are frozen with their deformed condition, the inner housing with the seal members being frozen is inserted into the outer housing and, thereafter, the seal members are thawed.

44. A method for assembling the hot and cold water mixing device by mounting the seal members on the seal-mounting parts of the inner housing and, thereafter, inserting the inner housing into the outer housing, characterized in that the seal members mounted on the seal-mounting parts are compressed and deformed so that their outer surfaces come to be flush with or smaller than the height of the outer circumferential surface of the seal-mounting parts, and are frozen with their deformed condition, the inner housing with the seal members being frozen is inserted into the outer housing and, thereafter, the seal members are thawed.

45. A method for assembling the hot and cold water mixing device as claimed in claim 43, characterized that the seal members are compressed and deformed by a fastening jig and are frozen by liquid nitrogen, and the fastening jig after the seal members are frozen is removed.

46. A method for assembling the hot and cold water mixing device as claimed in claim 45, characterized in that the fastening jig comprises jig bodies which are divided into a plurality of pieces in the circumferential direction and which are tubular in form as a whole, and fastening members for fastening said jig bodies, and a coil-like sheet metal which is increased and decreased in diameter due to radial movement of said jig bodies is interposed between the jig bodies and the seal members.

47. A method for sealing the water passages formed by defining the space between the outer housing and inner housing constituting the hot and cold water mixing device by insulating members provided so as to project on the outer surface of the inner housing, wherein after said inner housing is inserted into said outer housing, a liquid seal material is injected at a position of communicating with a concave groove provided on the holding part of the inner housing for mounting an insulating member, into said concave groove from an injection hole for a liquid seal material drilled through the tube wall of said outer housing, and the liquid seal material is set to thereby perform the seal of said water passages.

48. A hot and cold water mixing device as claimed in claim 20, wherein the mixed water insulating member is formed at least integrally with the hot water insulating member.

49. A hot and cold water mixing device as claimed in claim 29, wherein the mixed water insulating member is formed at least integrally with the hot water insulating member.

50. A hot and cold water mixing device as claimed in claim 30, wherein the mixed water insulating member is formed at least integrally with the hot water insulating member.

51. A hot and cold water mixing device as claimed in claim 29, wherein sealing members for sealing the vacant space between the inner housing and the outer housing are mounted on both ends of the inner housing.

52. A hot and cold water mixing device as claimed in claim 29, wherein the mixed water insulating member is arranged within a range smaller than half the outer circumference of the inner housing.

53. A method for assembling the hot and cold water mixing device as claimed in claim 44, characterized in that the seal members are compressed and deformed by a fastening jig and are frozen by liquid nitrogen, and the fastening jig after the seal members are frozen is removed.

* * * * *